United States Patent
Chedester et al.

(10) Patent No.: US 6,611,696 B2
(45) Date of Patent: *Aug. 26, 2003

(54) METHOD AND APPARATUS FOR ALIGNING THE ANTENNAS OF A MILLIMETER WAVE COMMUNICATION LINK USING A NARROW BAND OSCILLATOR AND A POWER DETECTOR

(75) Inventors: Richard Chedester, Whately, MA (US); Paul Johnson, Kihei, HI (US); Thomas Lambert, Makawao, HI (US); Randall B. Olsen, Carlsbad, CA (US); John Lovberg, San Diego, CA (US); Kenneth Y. Tang, Alpine, CA (US); Vladimir Kolinko, San Diego, CA (US); George Houghton, San Diego, CA (US)

(73) Assignee: Trex Enterprises Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/041,083

(22) Filed: Jan. 5, 2002

(65) Prior Publication Data

US 2002/0177405 A1 Nov. 28, 2002

Related U.S. Application Data

(63) Continuation-in-part of application No. 10/025,127, filed on Dec. 18, 2001, and a continuation-in-part of application No. 10/000,182, filed on Dec. 1, 2001, and a continuation-in-part of application No. 09/992,251, filed on Nov. 13, 2001, and a continuation-in-part of application No. 10/001,617, filed on Oct. 30, 2001, and a continuation-in-part of application No. 10/046,348, filed on Oct. 25, 2001, and a continuation-in-part of application No. 09/965,875, filed on Sep. 28, 2001, and a continuation-in-part of application No. 09/952,591, filed on Sep. 14, 2001, and a continuation-in-part of application No. 09/882,482, filed on Jun. 14, 2001, and a continuation-in-part of application No. 09/872,621, filed on Jun. 2, 2001, and a continuation-in-part of application No. 09/872,542, filed on Jun. 2, 2001, and a continuation-in-part of application No. 09/847,629, filed on May 2, 2001, now Pat. No. 6,556,836.

(51) Int. Cl.$^7$ .................. H04M 1/00; H04B 15/00; H01Q 7/00

(52) U.S. Cl. ............... 455/562; 455/505; 455/424; 455/25; 455/9; 455/67.5; 343/894; 343/760; 343/754; 343/720; 342/359; 370/315

(58) Field of Search ................. 455/504, 505, 455/506, 423, 424, 445, 25, 562, 561, 7, 9, 10, 67.1, 67.5, 73; 343/894, 874, 760, 757, 753, 754, 720; 342/359, 360; 370/315, 468, 492, 501; 375/211

(56) References Cited

U.S. PATENT DOCUMENTS 4,696,053 A * 9/1987 Mastriani et al. ........... 342/359

(List continued on next page.)

Primary Examiner—William Trost
Assistant Examiner—Rafael Perez-Gutierrez
(74) Attorney, Agent, or Firm—John R. Ross; John R. Ross, III

(57) ABSTRACT

An apparatus and method for aligning the antennas of two transceivers of a point-to-point wireless millimeter wave communications link. A narrow band oscillator power source is substituted for the signal transmitting electronics associated with a first antenna and a power detector is substituted for the signal receiving electronics associated with a second antenna. In preferred embodiments after a first alignment procedure is performed, the procedure is repeated with an oscillator power source connected to the second antenna and a power detector connected to the first antenna. In other preferred embodiments the antennas are pre-aligned using a signaling mirror or a narrow beam search light or laser. After the antennas are aligned the transceiver electronics are reconnected. In preferred embodiments the communication link operates within the 92 to 95 GHz portion of the millimeter spectrum and provides data transmission rates in excess of 155 Mbps.

42 Claims, 20 Drawing Sheets

U.S. PATENT DOCUMENTS

| | | | |
|---|---|---|---|
| 5,701,591 A | * 12/1997 | Wong | 455/63 |
| 5,864,321 A | * 1/1999 | Paul et al. | 343/757 |
| 5,890,055 A | * 3/1999 | Chu et al. | 455/23 |
| 5,936,578 A | * 8/1999 | Driessen et al. | 455/65 |
| 5,999,519 A | * 12/1999 | Basile et al. | 370/310 |
| 6,006,070 A | * 12/1999 | Wong | 455/63 |
| 6,016,313 A | * 1/2000 | Foster, Jr. et al. | 45/562 |
| 6,233,435 B1 | * 5/2001 | Wong | 455/63 |
| 6,240,274 B1 | * 5/2001 | Izadpanah | 455/39 |
| 6,366,584 B1 | * 4/2002 | Gulliford et al. | 370/403 |
| 2003/0027586 A1 | * 2/2003 | Johnson et al. | 455/517 |

* cited by examiner

-24.000 ns    1.000 ns    26.000 ns
5.00 ns/div    Real time
2   200 mV/
0.00000 V

RECEIVER SIGNAL FROM BERT 200

-4.000 ns    1.000 ns    6.000 ns
1.00 ns/div    Real time
2   500 mV/
0.00000 V

RECEIVER SIGNAL FROM BERT 200

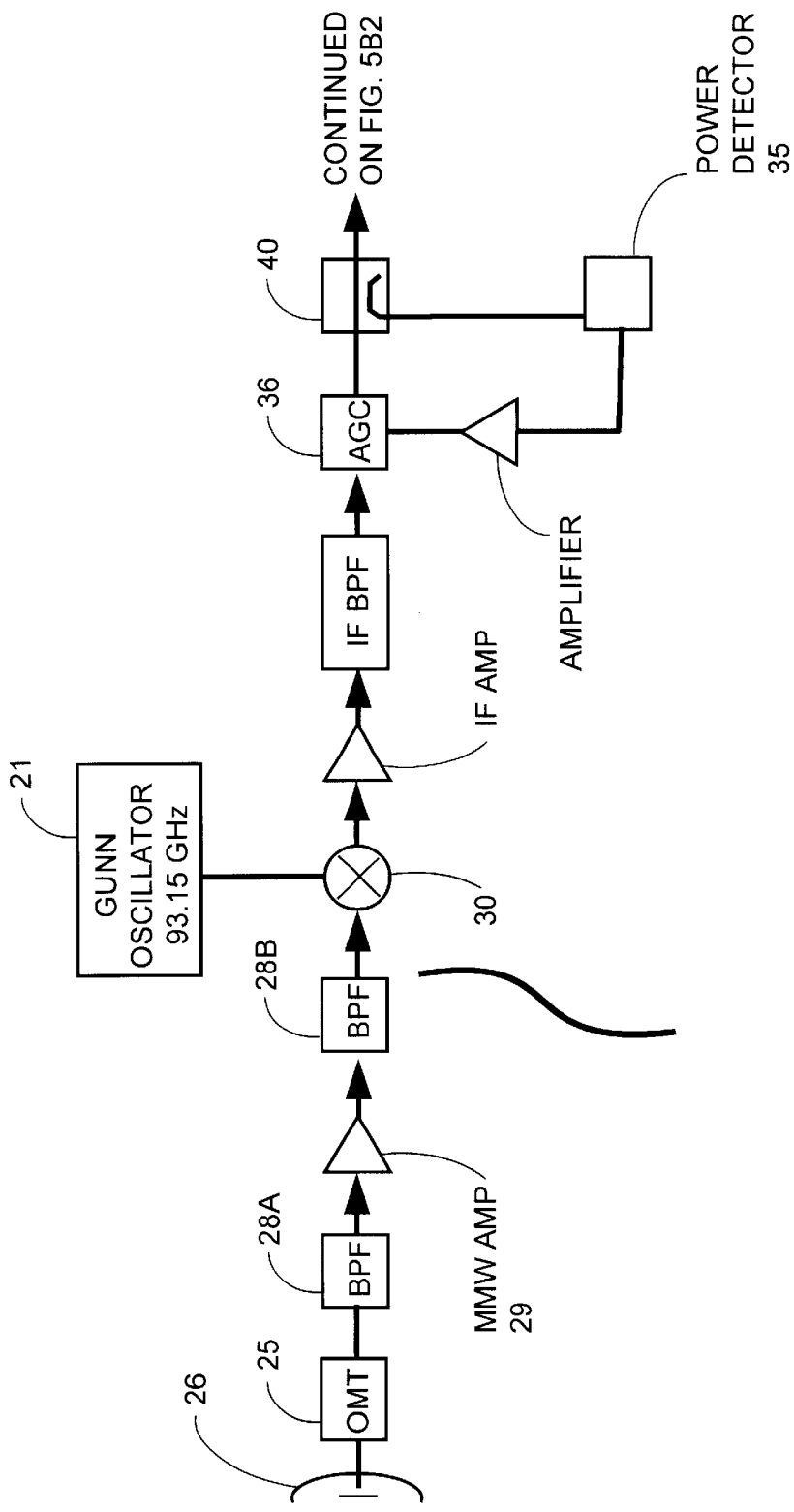
FIG. 5B1

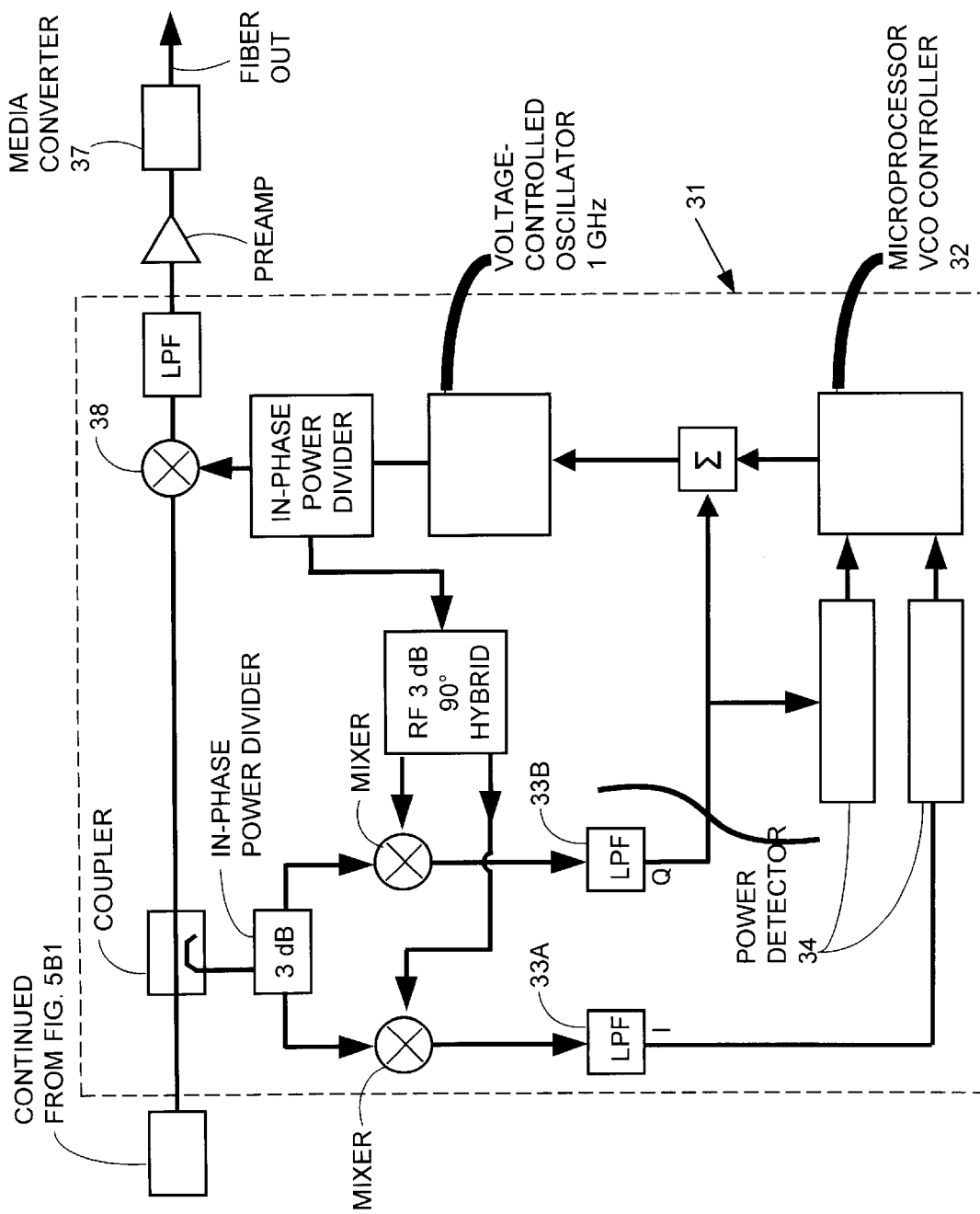
FIG. 5B2

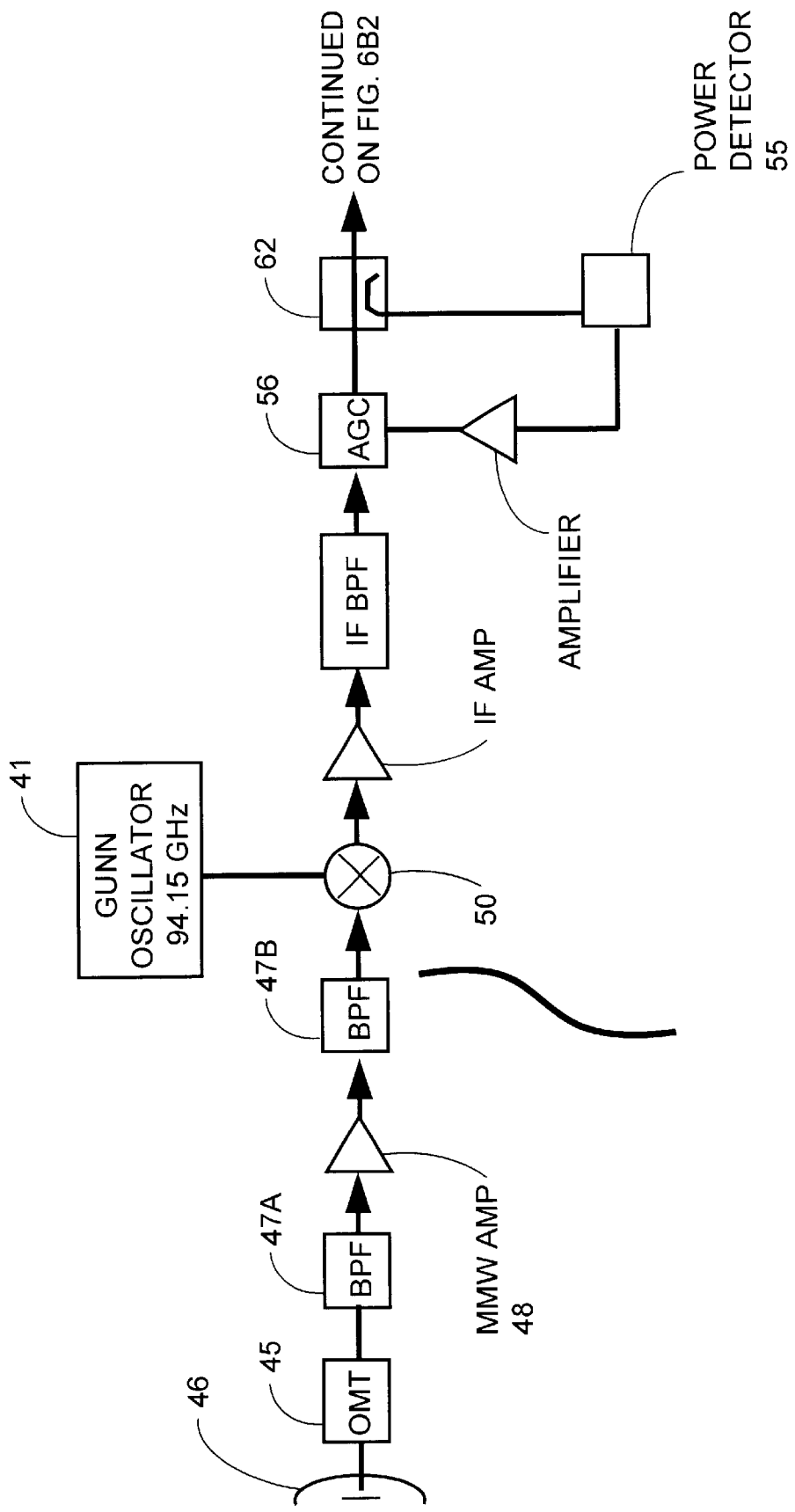
FIG. 6B1

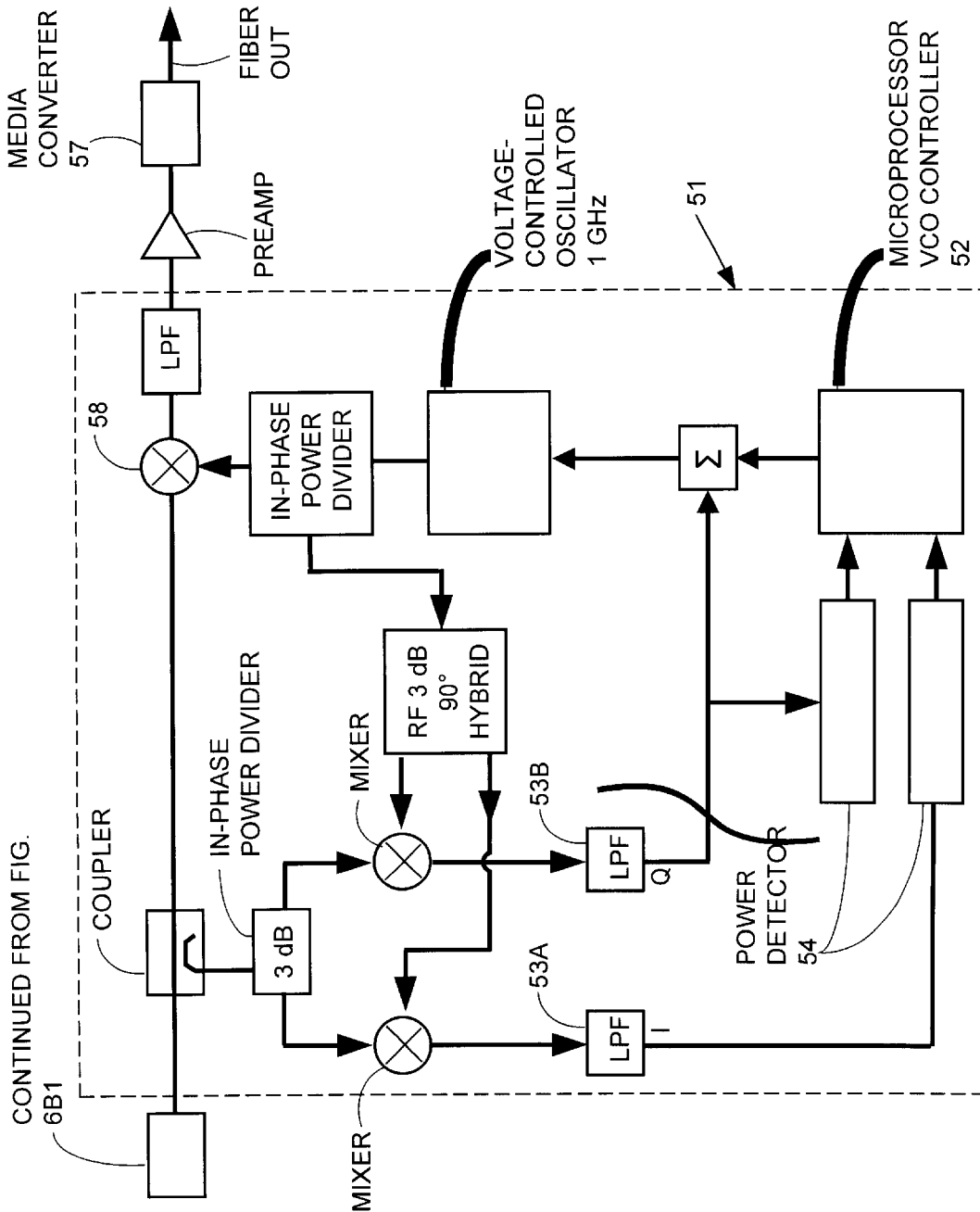
FIG. 6B2

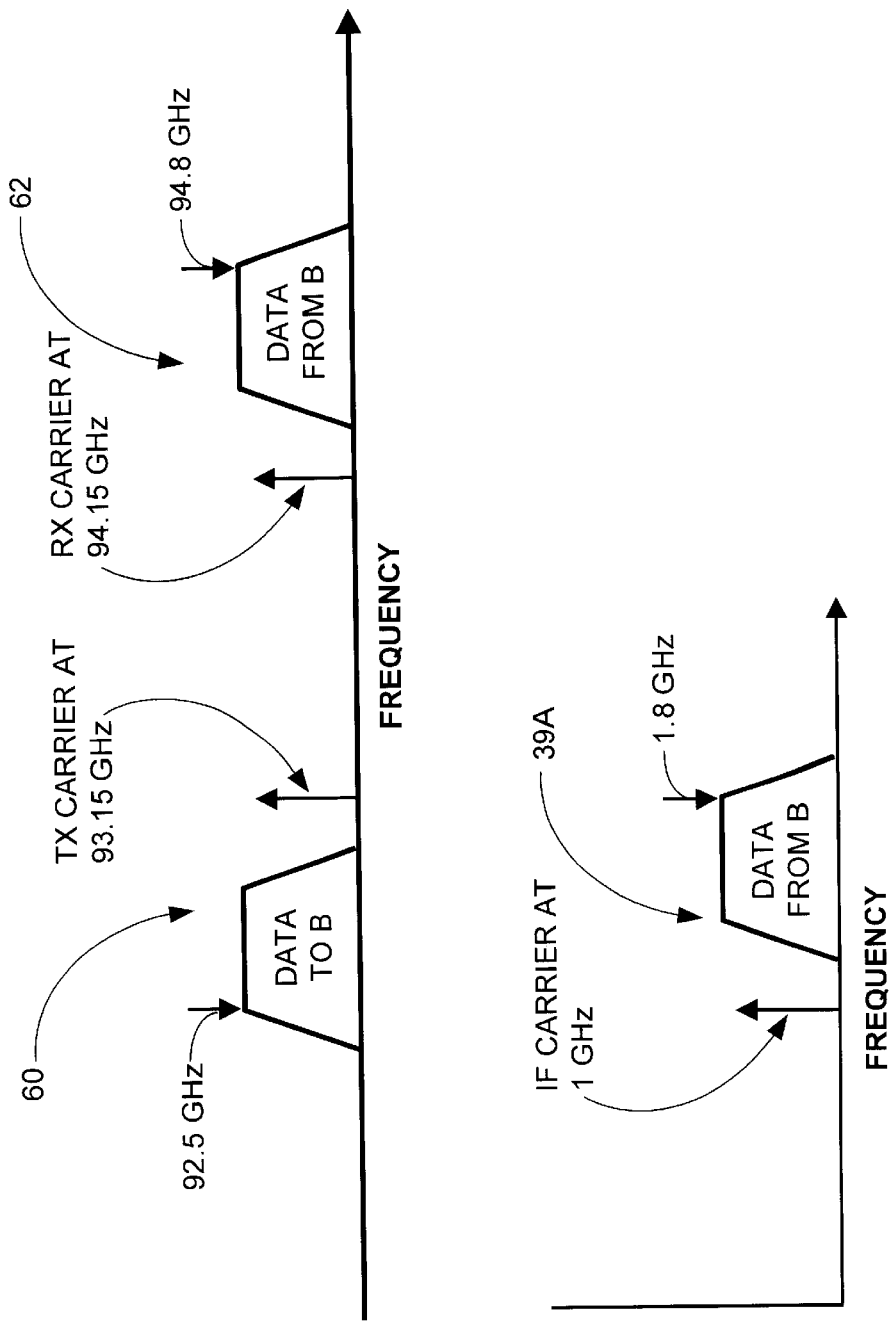

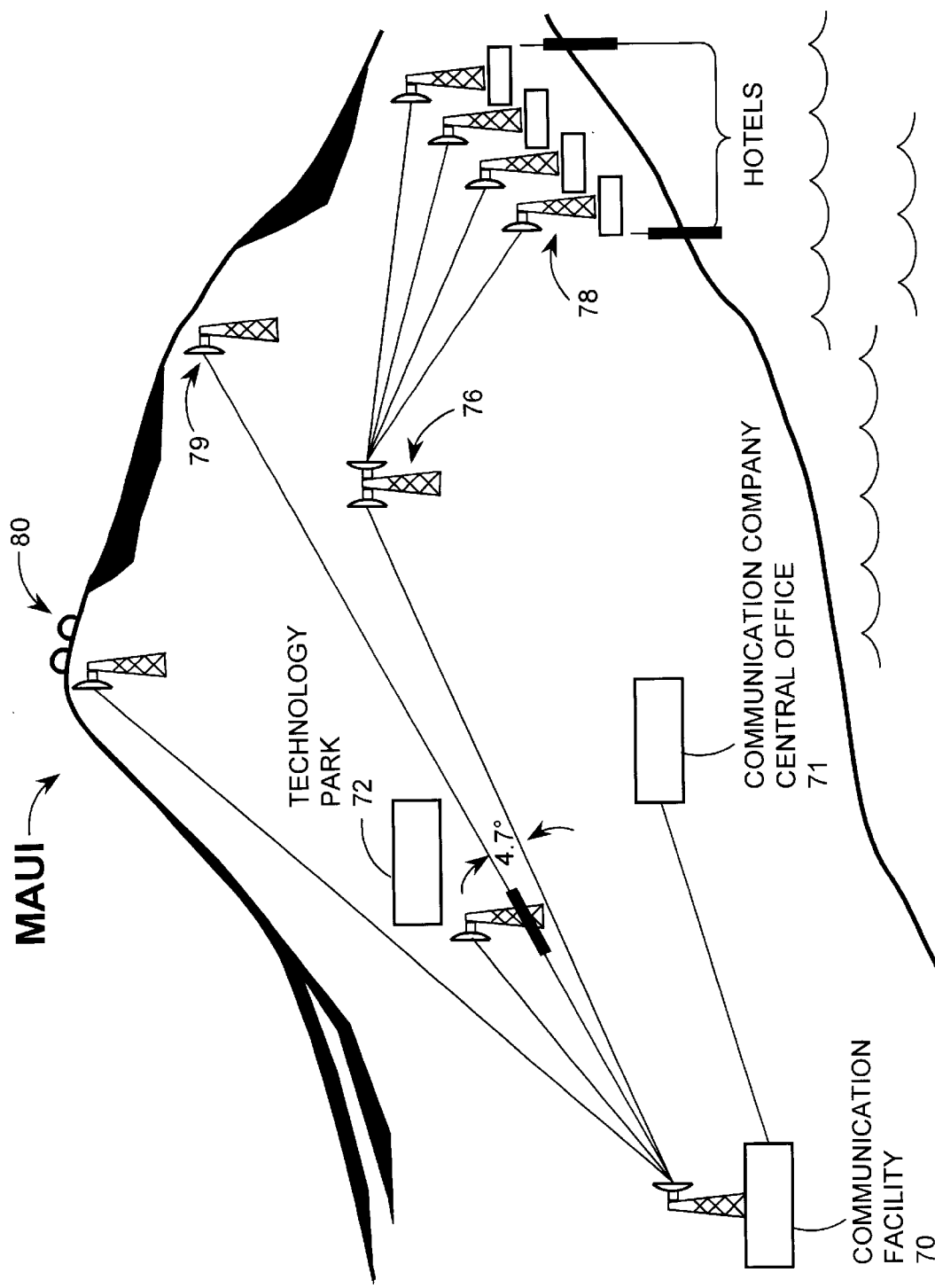

METHOD AND APPARATUS FOR ALIGNING THE ANTENNAS OF A MILLIMETER WAVE COMMUNICATION LINK USING A NARROW BAND OSCILLATOR AND A POWER DETECTOR

This application is a continuation-in-part application of Ser. No. 09/847,629 filed May 2, 2001, now U.S. Pat. No. 6,556,836, Ser. No. 09/872,542 filed Jun. 2, 2001, Ser. No. 09/872,621 filed Jun. 2, 2001, Ser. No. 09/882,482 filed Jun. 14, 2001, Ser. No. 09/952,591, filed Sep. 14, 2001, Ser. No. 09/965,875 filed Sep. 28, 2001 Ser. No. 10/046,348 filed Oct. 25, 2001, Ser. No. 10/001,617 filed Oct. 30, 2001, Ser. No. 09/992,251 filed Nov. 13, 2001, Ser. No. 10/000,182 filed Dec. 1, 2001 and Ser. No. 10/025,127, filed Dec. 18, 2001 all of which are incorporated herein by reference. The present invention relates to wireless communications links and specifically to high data rate point-to-point links.

BACKGROUND OF THE INVENTION

Wireless Communication Point-to-Point and Point-to-Multi-Point

Wireless communications links, using portions of the electromagnetic spectrum, are well known. Most such wireless communication at least in terms of data transmitted is one way, point to multi-point, which includes commercial radio and television. However there are many examples of point-to-point wireless communication. Mobile telephone systems that have recently become very popular are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Need for High Volume Information Transmission

The need for faster (i.e., higher volume per unit time) information transmission is growing rapidly. Today and into the foreseeable future transmission of information is and will be digital with volume measured in bits per second. To transmit a typical telephone conversation digitally utilizes about 5,000 bits per second (5 Kbits per second). Typical personal computer modems connected to the Internet operate at, for example, 56 Kbits per second. Music can be transmitted point to point in real time with good quality using mp3 technology at digital data rates of 64 Kbits per second. Video can be transmitted in real time at data rates of about 5 million bits per second (5 Mbits per second). Broadcast quality video is typically at 45 or 90 Mbps. Companies (such as telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit (billion bits, Gbits, per second) range. Most modem trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line. Digital microwave communication has been available since the mid-1970's. Service in the 18–23 GHz radio spectrum is called "short-haul microwave" providing point-to-point service operating between 2 and 7 miles and supporting between four to eight T1 links (each at 1.544 Mbps). Recently, microwave systems operation in the 11 to 38 GHz band have reportedly been designed to transmit at rates up to 155 Mbps (which is a standard transmit frequency known as "OC-3 Standard") using high order modulation schemes.

Data Rate vs. Frequency

Bandwidth-efficient modulation schemes allow, as a general rule, transmission of data at rates of 1 to 10 bits per Hz of available bandwidth in spectral ranges including radio wave lengths to microwave wavelengths. Data transmission requirements of 1 to tens of Gbps thus would require hundreds of MHz of available bandwidth for transmission. Equitable sharing of the frequency spectrum between radio, television, telephone, emergency services, military and other services typically limits specific frequency band allocations to about 10% fractional bandwidth (i.e., range of frequencies equal to about 10% of center frequency). AM radio, at almost 100% fractional bandwidth (550 to 1650 GHz) is an anomaly; FM radio, at 20% fractional bandwidth, is also atypical compared to more recent frequency allocations, which rarely exceed 10% fractional bandwidth.

Reliability Requirements

Reliability typically required for wireless data transmission is very high, consistent with that required for hardwired links including fiber optics. Typical specifications for error rates are less than one bit in ten billion ($10^{-10}$ bit-error rates), and link availability of 99.999% (5 minutes of down time per year). This necessitates all-weather link operability, in fog and snow, and at rain rates up to 100 mm/hour in many areas.

Weather Conditions

In conjunction with the above availability requirements, weather-related attenuation limits the useful range of wireless data transmission at all wavelengths shorter than the very long radio waves. Typical ranges in a heavy rainstorm for optical links (i.e., laser communication links) are 100 meters and for microwave links, 10,000 meters.

Atmospheric attenuation of electromagnetic radiation increases generally with frequency in the microwave and millimeter-wave bands. However, excitation of rotational transitions in oxygen and water vapor molecules absorbs radiation preferentially in bands near 60 and 118 GHz (oxygen) and near 23 and 183 GHz (water vapor). Rain, which attenuates through large-angle scattering, increases monotonically with frequency from 3 to nearly 200 GHz. At the higher, millimeter-wave frequencies, (i.e., 30 GHz to 300 GHz corresponding to wavelengths of 1.0 millimeter to 1.0 centimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

Need for Special Alignment Methods and Apparatus

High frequency, large antennas are typically designed to produce very narrow beams which must be very accurately aligned. Because of the narrow beams, both transmit and receive antennas must be precisely pointed at each other. Gimbals for these antennas are typically designed with two pointing angles; therefore, the process of aligning two antennas is essentially a 4 dimensional search. Since the antennas of the instant invention (such as a four-foot diameter antenna) can have narrow beams in the range of 0.15 degrees or less and are capable of thousands of discrete positions in each dimension, there are an extremely large number of four-dimensional alignments over which to search. As will be shown below, a complete search of this four-dimensional space could theoretically consume many years.

Therefore, what is needed is an apparatus and method for aligning a wireless data link having very narrow beam widths.

SUMMARY OF THE INVENTION

The present invention provides an apparatus and method for aligning the antennas of two transceivers of a point-to-point wireless millimeter wave communications link. A narrow band oscillator power source is substituted for the signal transmitting electronics associated with a first antenna and a power detector is substituted for the signal receiving electronics of associated with a second antenna. In preferred embodiments after a first alignment procedure is performed, the procedure is repeated with an oscillator power source connected to the second antenna and a power detector connected to the first antenna. In other preferred embodiments the antennas are pre-aligned using a signaling mirror or a narrow beam searchlight or laser. After the antennas are aligned the transceiver electronics are reconnected. In preferred embodiments the communication link operates within the 92 to 95 GHz portion of the millimeter spectrum and provides data transmission rates in excess of 155 Mbps. A first transceiver transmits at a first bandwidth and receives at a second bandwidth both within the above spectral range. A second transceiver transmits at the second bandwidth and receives at the first bandwidth. The transceivers are equipped with antennas providing beam divergence small enough to ensure efficient spatial and directional partitioning of the data channels so that an almost unlimited number of transceivers will be able to simultaneously use the same spectrum. Antennas and rigid support towers are described to maintain beam directional stability to less than one-half the half-power beam width. In a preferred embodiment the first and second spectral ranges are 92.3–93.2 GHz and 94.1–95.0 GHz and the half power beam width is about 0.15 degrees or less.

BRIEF DESCRIPTION OF THE DRAWINGS

FIGS. 5A, 5B1 and 5B2 are schematic diagrams of a millimeter-wave transmitter and receiver in one transceiver of a preferred embodiment of the present invention.

FIGS. 6A, 6B1 and 6B2 are schematic diagrams of a millimeter-wave transmitter and receiver in a complementary transceiver of a preferred embodiment of the present invention.

FIGS. 7A and 7B show the spectral diagrams for a preferred embodiment of the present invention.

FIG. 8 is a layout showing an installation using a preferred embodiment of the present invention.

FIGS. 9 and 9A show a preferred hollow steel tube antenna support structure (diameter of 24 inches) rigid enough for use in a preferred embodiment of the present invention.

DETAILED DESCRIPTION OF PREFERRED EMBODIMENTS

Prototype Demonstration

A prototype demonstration of the millimeter-wave transmitter and receiver useful for the present invention is described by reference to FIGS. 1 to 4. With this embodiment the Applicants have demonstrated digital data transmission in the 93 to 97 GHz range at 1.25 Gbps with a bit error rate below $10^{-12}$.

Figure 1:
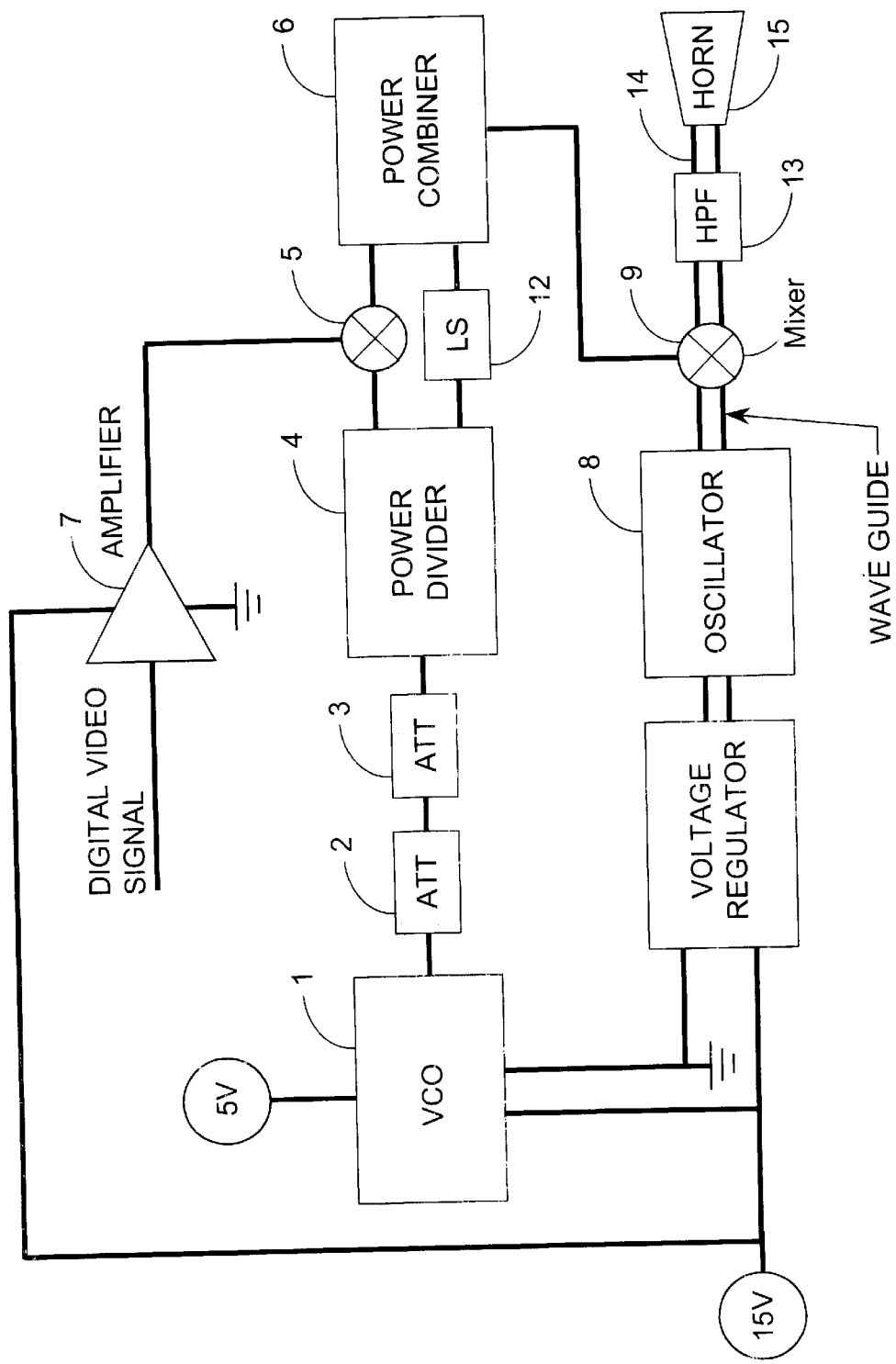
FIG. 1 is a schematic diagram of a millimeter-wave transmitter of a prototype transceiver system built and tested by Applicants.

The circuit diagram for the millimeter-wave transmitter is shown in FIG. 1. Voltage-controlled microwave oscillator 1, Westec Model VTS133/NV4, is tuned to transmit at 10 GHz, attenuated by 16 dB with coaxial attenuators 2 and 3, and divided into two channels in two-way power divider 4. A digital modulation signal is pre-amplified in amplifier 7, and mixed with the microwave source power in triple-balanced mixer 5, Pacific Microwave Model M3001HA. The modulated source power is combined with the un-modulated source power through a two-way power combiner 6. A line stretcher 12 in the path of the un-modulated source power controls the depth of modulation of the combined output by adjusting for constructive or destructive phase summation. The amplitude-modulated 10 GHz signal is mixed with a signal from a 85-GHz source oscillator 8 in mixer 9 and high-pass filtered in waveguide filter 13 to reject the 75 GHz image band. The resultant, amplitude-modulated 95 GHz signal contains spectral components between 93 and 97 GHz, assuming unfiltered 1.25 Gbps modulation. A rectangular WR-10 wave guide output of the high pass filter is converted to a circular wave guide 14 and fed to a circular horn 15 of 4 inches diameter, where it is transmitted into free space. The horn projects a half-power beam width of 2.2 degrees.

Figure 2:
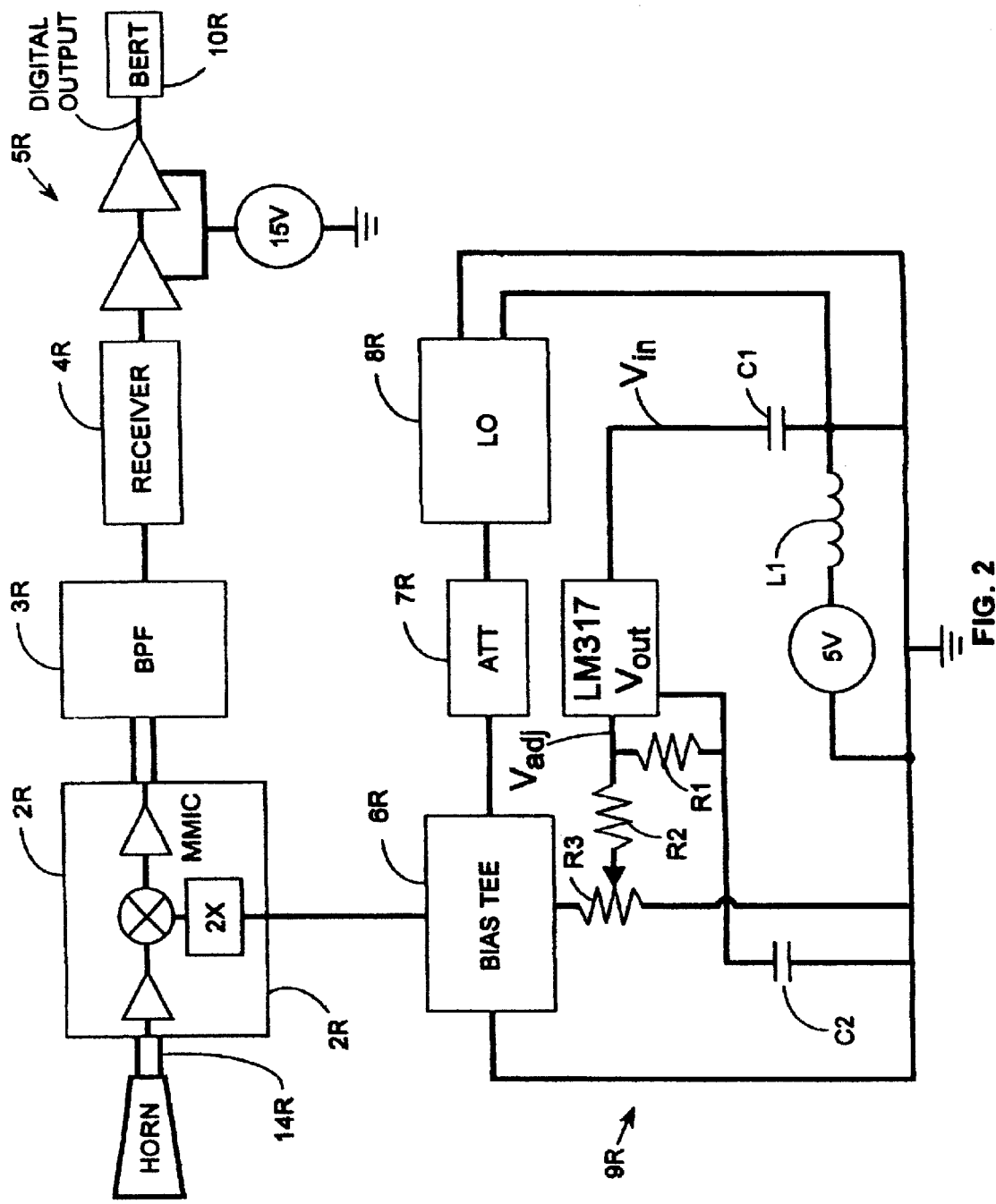
FIG. 2 is a schematic diagram of a millimeter-wave receiver of a prototype transceiver system built and tested by Applicants.

The circuit diagram for the receiver is shown in FIG. 2. The antenna is a circular horn 1 of 6 inches in diameter, fed from a waveguide unit 14R consisting of a circular W-band wave-guide and a circular-to-rectangular wave-guide converter which translates the antenna feed to WR-10 waveguide which in turn feeds heterodyne receiver module 2R. This module consists of a monolithic millimeter-wave integrated circuit (MMIC) low-noise amplifier spanning 89–99 GHz, a mixer with a two-times frequency multiplier at the LO port, and an IF amplifier covering 5–15 GHz. These receivers are available from suppliers such as Lockheed Martin. The local oscillator 8R is a cavity-tuned Gunn oscillator operating at 42.0 GHz (Spacek Model GQ410K), feeding the mixer in module R2 through a 6 dB attenuator 7. A bias tee 6R at the local oscillator input supplies DC power to receiver module 2R. A voltage regulator circuit using a National Semiconductor LM317 integrated circuit regulator supplies +3.3V through bias tee 6R. An IF output of the heterodyne receiver module 2R is filtered at 6–12 GHz using bandpass filter 3R from K&L Microwave. Receiver 4R that is an HP Herotek Model DTM 180AA diode detector, measures total received power. The voltage output from the diode detector is amplified in two-cascaded microwave amplifiers 5R from MiniCircuits, Model 2FL2000. The baseband output is carried on coax cable to a media converter for conversion to optical fiber, or to a Bit Error-Rate Tester (BERT) 10R.

Figure 3:
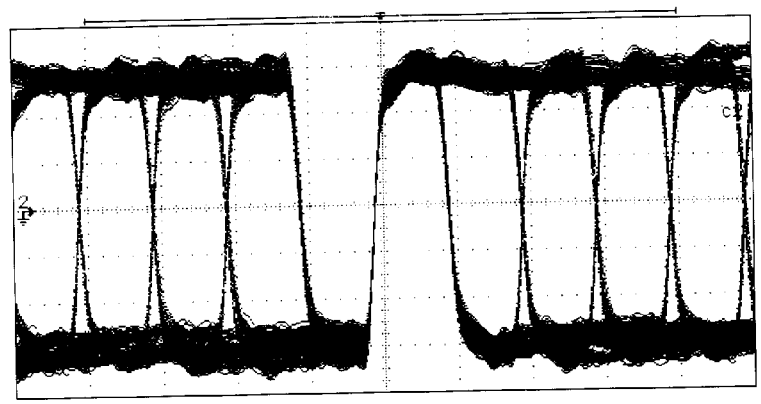
FIG. 3 is measured receiver output voltage from the prototype transceiver at a transmitted bit rate of 200 Mbps.
Figure 4:
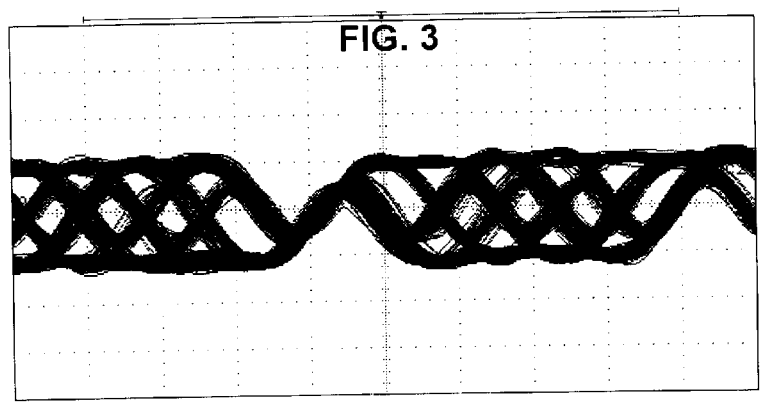
FIG. 4 is the same waveform as FIG. 3, with the bit rate increased to 1.25 Gbps.

In the laboratory, this embodiment has demonstrated a bit-error rate of less than $10^{-12}$ for digital data transmission at 1.25 Gbps. The BERT measurement unit was a Microwave Logic, Model gigaBERT. The oscilloscope signal for digital data received at 200 Mbps is shown in FIG. 3. At 1.25 Gbps, oscilloscope bandwidth limitations lead to the rounded bit edges seen in FIG. 4. Digital levels sustained for more than one bit period comprise lower fundamental frequency components (less than 312 MHz) than those which toggle each period (622 MHz), so the modulation transfer function of the oscilloscope, which falls off above 500 MHz, attenuates them less. These measurement artifacts are not reflected in the bit error-rate measurements, which yield $<10^{-12}$ bit error rate at 1.25 Gbps.

Transceiver System

A preferred embodiment of the present invention is described by reference to FIGS. 5 to 7. The link hardware consists of a millimeter-wave transceiver pair including a pair of millimeter-wave antennas and a microwave transceiver pair including a pair of microwave antennas. The millimeter wave transmitter signal is amplitude modulated and single-sideband filtered, and includes a reduced-level carrier. The receiver includes a heterodyne mixer, phase-locked intermediate frequency (IF) tuner, and IF power detector.

Figure 6A:
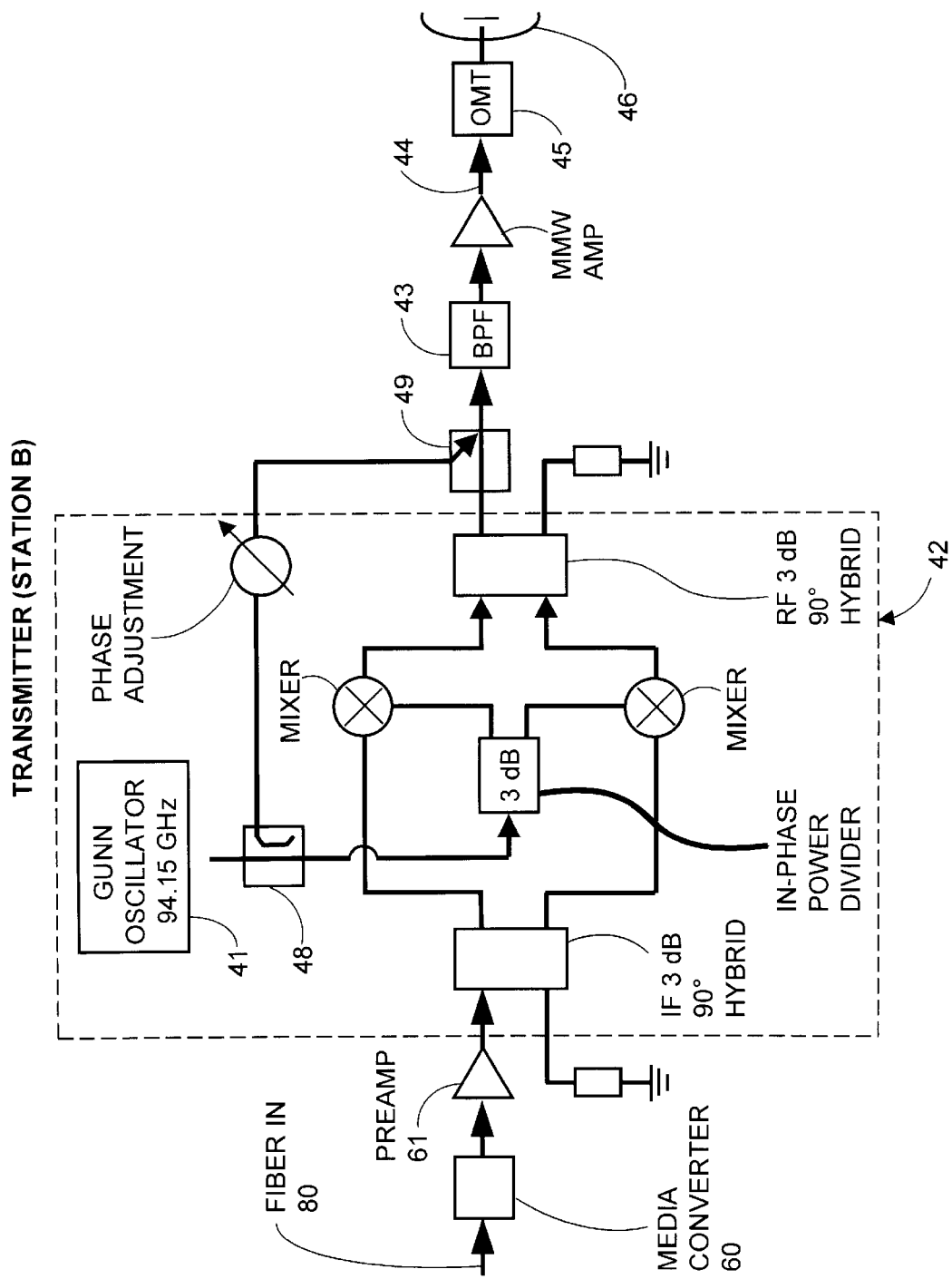
Figure 7B:
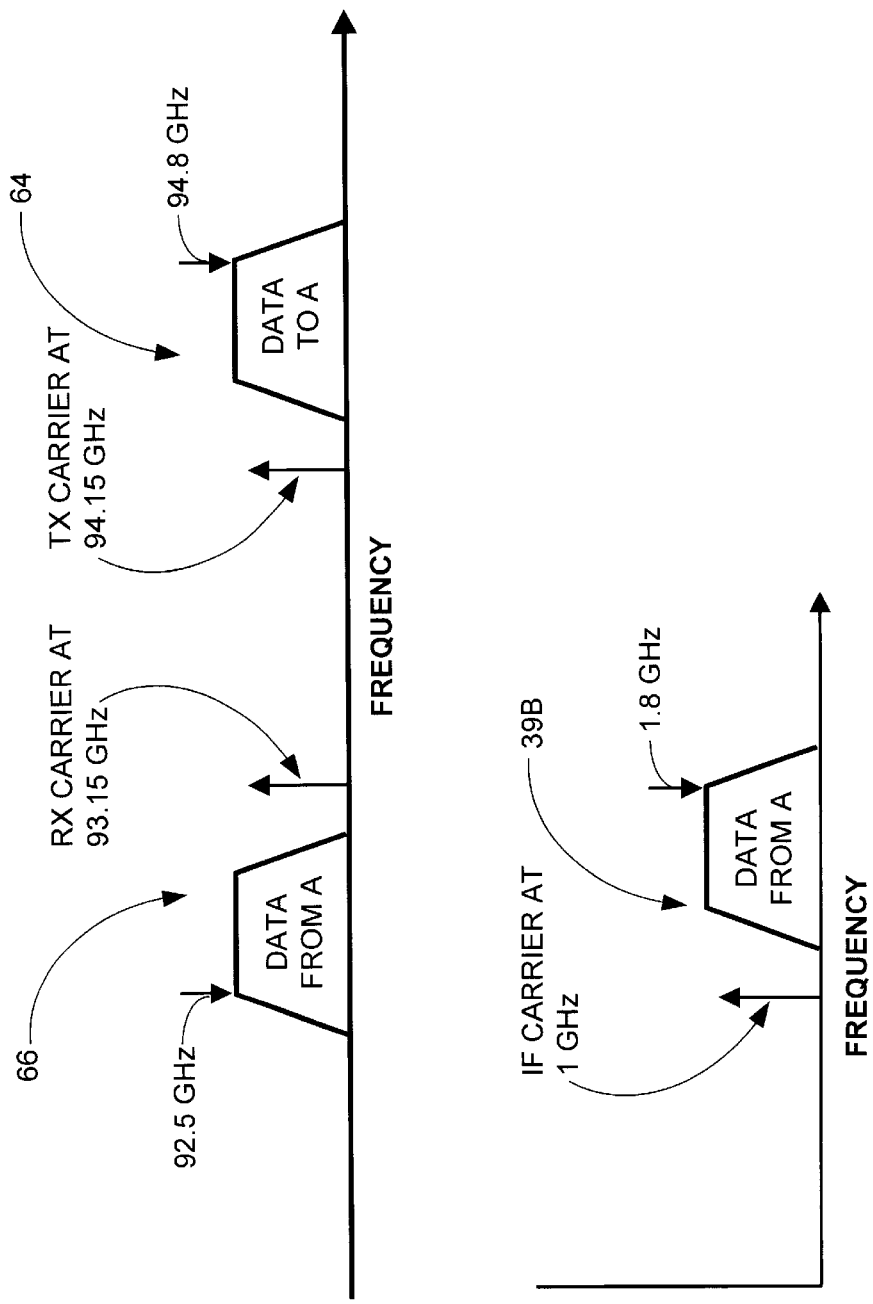

Millimeter-wave transceiver A (FIGS. 5A, 5B1 and 5B2) transmits at 92.3–93.2 GHz as shown at 60 in FIG. 7A and receives at 94.1–95.0 GHz as shown at 62, while millimeter-wave transmitter B (FIGS. 6A, 6B1 and 6B2) transmits at 94.1–95.0 GHz as shown at 64 in FIG. 7B and receives at 92.3–93.2 GHz as shown at 66.

Millimeter Wave Transceiver A

Figure 5A:
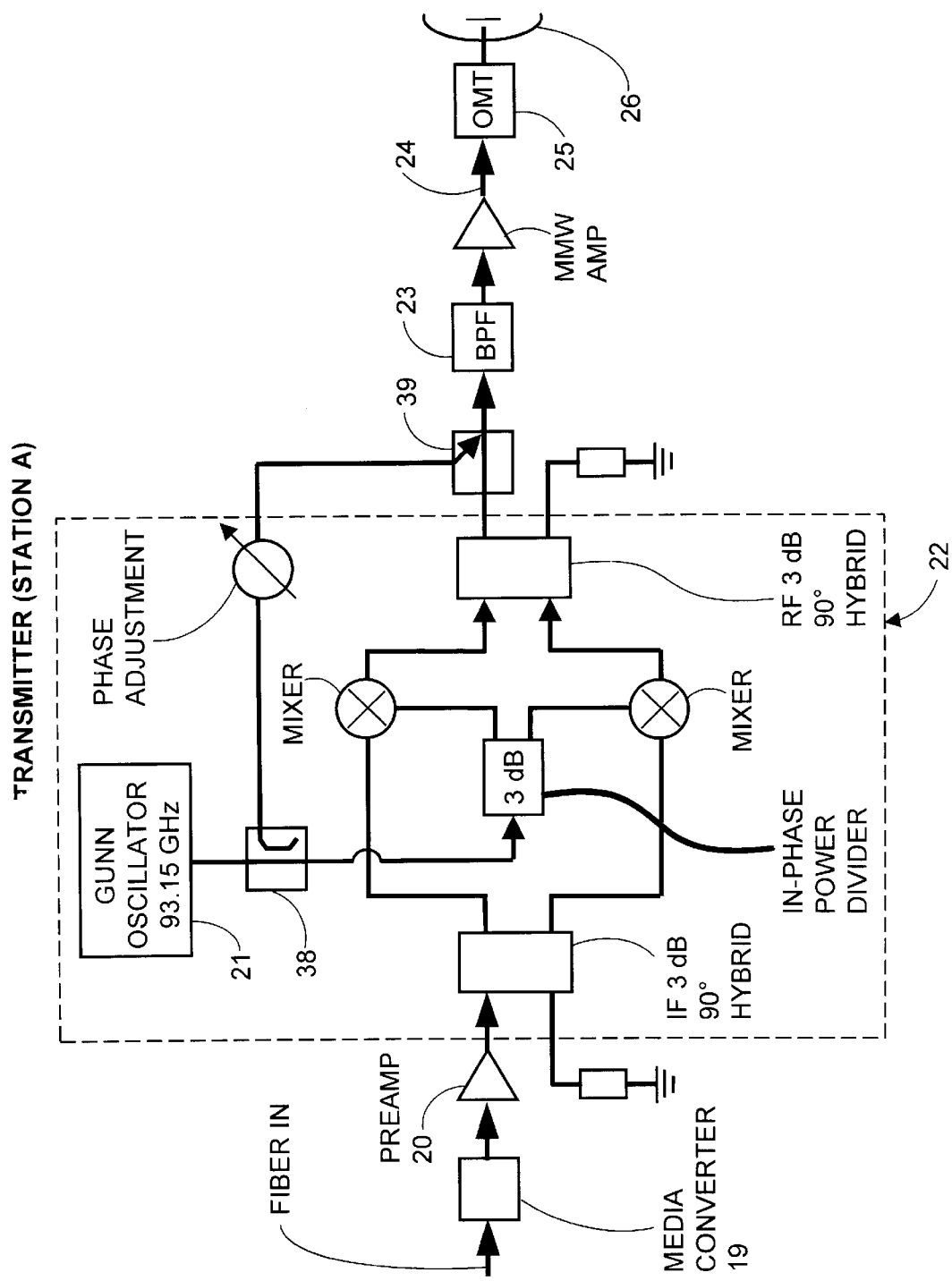

As shown in FIG. 5A in millimeter-wave transceiver A, transmit power is generated with a cavity-tuned Gunn diode 21 resonating at 93.15 GHz. This power is amplitude modulated using two balanced mixers in an image reject configuration 22, selecting the lower sideband only. The source 21 is modulated at 1.25 Gbps in conjunction with Gigabit-Ethernet standards. The modulating signal is brought in on optical fiber, converted to an electrical signal in media converter 19 (which in this case is an Agilent model HFCT-5912E) and amplified in preamplifier 20. The amplitude-modulated source is filtered in a 900 MHz-wide passband between 92.3 and 93.2 GHz, using a bandpass filter 23 on microstrip. A portion of the source oscillator signal is picked off with coupler 38 and combined with the lower sideband in power combiner 39, resulting in the transmitted spectrum shown at 60 in FIG. 7A. The combined signal propagates with horizontal polarization through a waveguide 24 to one port of an orthomode transducer 25, and on to a four-foot diameter Cassegrain dish antenna 26, where it is transmitted into free space with horizontal polarization.

The receiver unit at Station A as shown on FIGS. 5B1 and 5B2 is fed from the same Cassegrain antenna 26 as is used by the transmitter, at vertical polarization (orthogonal to that of the transmitter), through the other port of the orthomode transducer 25. The received signal is pre-filtered with bandpass filter 28A in a passband from 94.1 to 95.0 GHz, to reject back scattered return from the local transmitter. The filtered signal is then amplified with a monolithic MMW integrated-circuit amplifier 29 on indium phosphide, and filtered again in the same passband with bandpass filter 28B. This twice filtered signal is mixed with the transmitter source oscillator 21 using a heterodyne mixer-downconverter 30, to an IF frequency of 1.00–1.85 GHz, giving the spectrum shown at 39A in FIG. 7A. A portion of the IF signal, picked off with coupler 40, is detected with integrating power detector 35 and fed to an automatic gain control circuit 36. The fixed-level IF output is passed to the next stage as shown in FIG. 5B2. Here a quadrature-based (I/Q) phase-locked synchronous detector circuit 31 is incorporated, locking on the carrier frequency of the remote source oscillator. The loop is controlled with a microprocessor 32 to minimize power in the "Q" channel while verifying power above a set threshold in the "I" channel. Both "I" and "Q" channels are lowpass-filtered at 200 MHz using lowpass filters 33A and 33B, and power is measured in both the "I" and "Q" channels using square-law diode detectors 34. The baseband mixer 38 output is pre-amplified and fed through a media converter 37, which modulates a laser diode source into a fiber-optic coupler for transition to optical fiber transmission media.

Transceiver B

As shown in FIG. 6A in millimeter-wave transceiver B, transmit power is generated with a cavity-tuned Gunn diode 41 resonating at 94.15 GHz. This power is amplitude modulated using two balanced mixers in an image reject configuration 42, selecting the upper sideband only. The source 41 is modulated at 1.25 Gbps in conjunction with Gigabit-Ethernet standards. The modulating signal is brought in on optical fiber as shown at 80, converted to an electrical signal in media converter 60, and amplified in preamplifier 61. The amplitude-modulated source is filtered in a 900 MHz-wide passband between 94.1 and 95.0 GHz, using a bandpass filter 43 on microstrip. A portion of the source oscillator signal is picked off with coupler 48 and combined with the higher sideband in power combiner 49, resulting in the transmitted spectrum shown at 64 in FIG. 7B. The combined signal propagates with vertical polarization through a waveguide 44 to one port of an orthomode transducer 45, and on to a four-foot Cassegrain dish antenna 46, where it is transmitted into free space with vertical polarization.

The receiver is fed from the same Cassegrain antenna 46 (FIG. 6B1) as the transmitter, at horizontal polarization (orthogonal to that of the transmitter), through the other port of the orthomode transducer 45. The received signal is filtered with bandpass filter 47A in a passband from 92.3 to 93.2 GHz, to reject backscattered return from the local transmitter. The filtered signal is then amplified with a monolithic MMW integrated-circuit amplifier on indium phosphide 48, and filtered again in the same passband with bandpass filter 47B. This twice filtered signal is mixed with the transmitter source oscillator 41 using a heterodyne mixer-downconverter 50, to an IF frequency of 1.00–1.85 GHz, giving the spectrum shown at 39B in FIG. 7B. A portion of the IF signal, picked off with coupler 62, is detected with integrating power detector 55 and fed to an automatic gain control circuit 56. The fixed-level IF output is passed to the next stage as shown on FIG. 6B2. Here a quadrature-based (I/Q) phase-locked synchronous detector circuit 51 is incorporated, locking on the carrier frequency of the remote source oscillator. The loop is controlled with a microprocessor 52 to minimize power in the "Q" channel while verifying power above a set threshold in the "I" channel. Both "I" and "Q" channels are lowpass-filtered at 200 MHz using a bandpass filters 53A and 53B, and power is measured in each channel using a square-law diode detector 54. The baseband mixer 58 output is pre-amplified and fed through a media converter 57, which modulates a laser diode source into a fiber-optic coupler for transition to optical fiber transmission media.

Very Narrow Beam Width

A dish antenna of four-foot diameter projects a half-power beam width of about 0.15 degrees at 94 GHz. The full-power beamwidth (to first nulls in antenna pattern) is narrower than 0.45 degrees. This suggests that about 800 independent beams could be projected azimuthally around an equator from a single transmitter location, without mutual interference, from an array of 4-foot dishes. At a distance of ten miles, two receivers placed 400 feet apart can receive independent data channels from the same transmitter location. Conversely, two receivers in a single location can discriminate independent data channels from two transmitters ten miles away, even when the transmitters are as close as 400 feet apart. Larger dishes can be used for even more directivity.

Rigid Antenna Support

A communication beam having a half-power beam width of only about 0.15 degrees requires an extremely stable antenna support. Prior art antenna towers such as those used for microwave communication typically are designed for angular stability of about 0.6 to 1.1 degrees or more. Therefore, the present invention requires much better control of beam direction. For good performance the receiving antenna should be located at all times within the half power foot print of the transmitted beam. At 10 miles the half power footprint of a 0.15 degree beam is about 150 feet. During initial alignment the beam should be directed so that the receiving transceiver antenna is located approximately at the center of the half-power beam width footprint area. The support for the transmitter antenna should be rigid enough so that the beam direction does not change enough so that the receiving transceiver antenna is outside the half-power footprint. Thus, in this example the transmitting antenna should be directionally stable to within +/−0.09 degrees.

This rigid support of the antenna not only assures continued communication between the two transceivers as designed but the narrow beam widths and rigid antenna support reduces the possibility of interference with any nearby links operating in the same spectral band.

Figure 9:
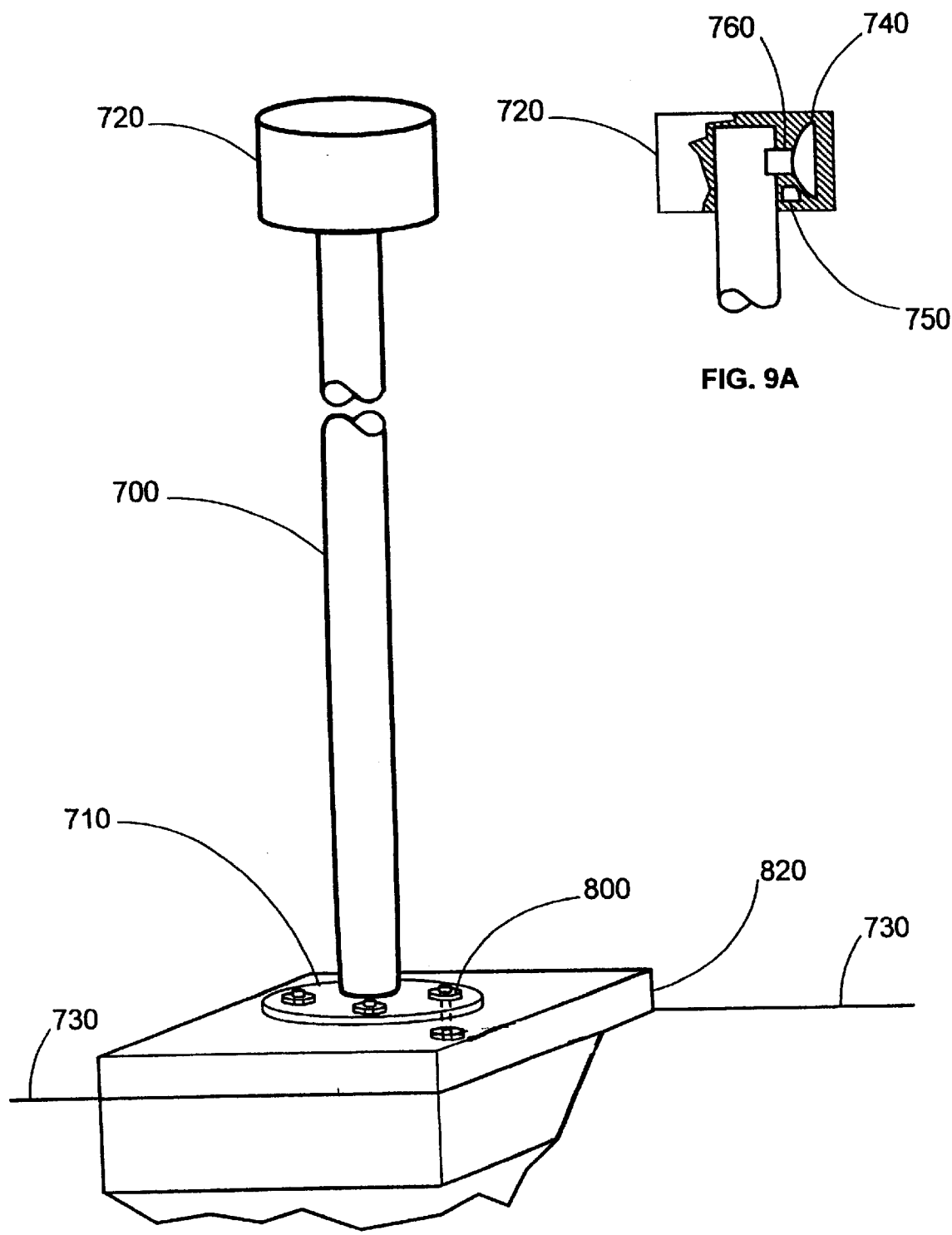
Figure 10:
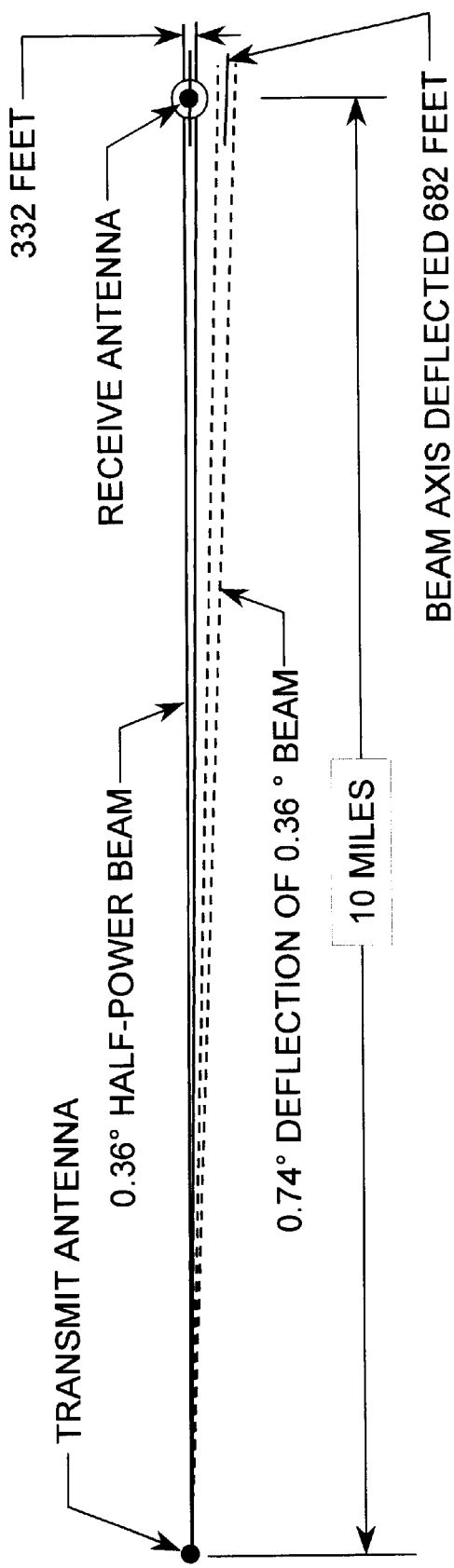
FIG. 10 shows how very slight directional instability can interfere with transmission.

Many rigid supports can be used for maintaining antenna alignment. Applicants have performed computer model studies of potential supports using WindCalculator software provided by Andrew Corp. with offices in St. Orland Park, Ill. and tower bending software know as Beam Calc.xls developed by WarrenDesignVision Company. For example, these calculations show that a solidly mounted 12-inch diameter 40 feet tall hollow carbon steel (one-half inch wall thickness) monopole tower having a 0.7 meter high, 1 meter diameter radome at the top (a two-foot diameter antenna is enclosed in the radome) would suffer deflections of about 0.74 degrees in a 90 mile per hour steady wind. FIG. 10 shows the effect of a 0.74-degree deflection of a 0.36-degree beam. The 0.74 degree deflection moves the beam axis 682 feet at 10 miles so that the receive antenna is clearly outside the beam 332 foot half power footprint. This angular variation would almost certainly disrupt communication between the millimeter wave links described above. However, similar calculations made for a solidly mounted 24-inch diameter, 40 feet tall hollow carbon steel monopole tower shows that the deflection in a 90 mile per hour wind would be only 0.11 degrees. This structure is shown in FIG. 9. The 24-inch tube 700 supports radome 720 enclosing antenna 740, antenna mount 760 and transceiver 750 (FIG. 9A). Flange 710 is welded to the bottom of tube 700 and is bolted with bolts 800 encased in reinforced concrete base 820 which is buried mostly below ground level 730. This would assure with substantial margin that the communication between the two transceivers would not be disrupted due to beam directional deviations. Therefore, in preferred embodiments, antennas of about 2 feet diameter are mounted on solidly mounted reinforced concrete monopole towers having heights of 40 feet or less as shown in FIG. 9. The reader should note that many other potential rigid structures could be designed to support the antennas with the directional stability required under the general guidelines outlined above. For example, antennas could be rigidly mounted on the side or top of stable buildings. Steel trussed towers could be used or monopoles with high tension guide wires. In each case however the designer should determine using reliable codes or actual testing that these alternate supports are adequate to maintain the needed directional stability.

It is also possible to take care of directional stability using active antenna directional control with a feedback control system. However, such a system although feasible will typically be much more expensive than the rigid supports of the type described above.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7–11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available off-the-shelf from vendors such as Western Multiplex Corporation (Models Lynx DS-3, Tsunami 100BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7–11.7 GHz band.

Sensing of a millimeter wave link failure and switching to redundant microwave channel is an existing automated feature of the network routing switching hardware available off-the-shelf from vendors such as Cisco, Foundry Networks and Juniper Networks.

Narrow Beam Width Antennas

The narrow antenna beam widths afforded at millimeter-wave frequencies allow for geographical portioning of the airwaves, which is impossible at lower frequencies. This fact eliminates the need for band parceling (frequency sharing), and so enables wireless communications over a much larger bandwidth, and thus at much higher data rates, than were ever previously possible at lower RF frequencies.

The ability to manufacture and deploy antennas with beam widths narrow enough to ensure non-interference, requires mechanical tolerances, pointing accuracies, and electronic beam steering/tracking capabilities, which exceed the capabilities of the prior art in communications antennas. A preferred antenna for long-range communication at frequencies above 70 GHz has gain in excess of 50 dB, 100 times higher than direct-broadcast satellite dishes for the home, and 30 times higher than high-resolution weather radar antennas on aircraft. However, where interference is not a potential problem, antennas with dB gains of 40 to 45 may be preferred.

Most antennas used for high-gain applications utilize a large parabolic primary collector in one of a variety of geometries. The prime-focus antenna places the receiver directly at the focus of the parabola. The Cassegrainian antenna places a convex hyperboloidal secondary reflector in front of the focus to reflect the focus back through an aperture in the primary to allow mounting the receiver behind the dish. (This is convenient since the dish is typically supported from behind as well.) The Gregorian antenna is similar to the Cassegrainian antenna, except that the secondary mirror is a concave ellipsoid placed in back of the parabola's focus. An offset parabola rotates the focus away from the center of the dish for less aperture blockage and improved mounting geometry. Cassegrainian, prime focus, and offset parabolic antennas are the preferred dish geometries for the MMW communication system.

A preferred primary dish reflector is a conductive parabola. The preferred surface tolerance on the dish is about 15 thousandths of an inch (15 mils) for applications below 40 GHz, but closer to 5 mils for use at 94 GHz. Typical hydroformed aluminum dishes give 15-mil surface tolerances, although double-skinned laminates (using two aluminum layers surrounding a spacer layer) could improve this to 5 mils. The secondary reflector in the Cassegrainian geometry is a small, machined aluminum "lollipop" which can be made to 1-mil tolerance without difficulty. Mounts for secondary reflectors and receiver waveguide horns preferably comprise mechanical fine-tuning adjustment for in-situ alignment on an antenna test range.

Flat Panel Antenna

Another preferred antenna for long-range MMW communication is a flat-panel slot array antenna such as that described by one of the present inventors and others in U.S. Pat. No. 6,037,908, issued Mar. 14, 2000 which is hereby incorporated herein by reference. That antenna is a planar phased array antenna propagating a traveling wave through the radiating aperture in a transverse electromagnetic (TEM) mode. A communications antenna would comprise a variant of that antenna incorporating the planar phased array, but eliminating the frequency-scanning characteristics of the antenna in the prior art by adding a hybrid traveling-wave/corporate feed. Flat plates holding a 5-mil surface tolerance are substantially cheaper and easier to fabricate than parabolic surfaces. Planar slot arrays utilize circuit-board processing techniques (e.g., photolithography), which are inherently very precise, rather than expensive high-precision machining.

Coarse and Fine Pointing

Pointing a high-gain antenna requires coarse and fine positioning. Coarse positioning can be accomplished initially using a visual sight such as a bore-sighted rifle scope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Beam Steering

Phased-array beam combining from several ports in the flat-panel phased array could steer the beam over many antenna beam widths without mechanically rotating the antenna itself. Sum-and-difference phase combining in a mono-pulse receiver configuration locates and locks on the proper "pipe." In a Cassegrainian antenna, a rotating, slightly unbalanced secondary ("conical scan") could mechanically steer the beam without moving the large primary dish. For prime focus and offset parabolas, a multi-aperture (e.g., quad-cell) floating focus could be used with a selectable switching array. In these dish architectures, beam tracking is based upon maximizing signal power into the receiver. In all cases, the common aperture for the receiver and transmitter ensures that the transmitter, as well as the receiver, is correctly pointed.

Typical Installation

FIG. 8 is a map layout of a proposed application of the present invention. This map depicts a sparsely populated section of the island, Maui in Hawaii. Shown are communication facility 70 which is connected to a major communication trunk line from a communication company's central office 71, a technology park 72 located about 2 miles from facility 70, a relay station 76 located about 6 miles from facility 70 and four large ocean-front hotels 78 located about 3 miles from relay station 76. Also shown is a mountaintop observatory 80 located 13 miles from facility 70 and a radio antenna tower 79 located 10 miles from facility 70. As indicated in FIG. 8, the angular separation between the radio antenna and the relay station is only 4.7 degrees. Four type-A transceiver units are positioned at facility 70, each comprising a transmitter and receiver unit as described in FIGS. 5A and 5B. These units are directed at corresponding type-B transceiver units positioned at the technology park, the relay station, the observatory, and the radio tower. Millimeter wave transceiver units with back-up microwave units as described above are also located at the hotels and are in communication with corresponding units at the relay station. In a preferred embodiment the 1.25 GHz spectrum is divided among the four hotels so that only one link needs to be provided between facility 70 and relay station 76. This system can be installed and operating within a period of about one month and providing the most modem communication links to these relatively isolated facilities. The cost of the system is a very small fraction of the cost of providing fiber optic links offering similar service.

The microwave backup links operate at approximately eight times lower frequency (8 times longer wavelength) than the millimeter wave link. Thus, at a given size, the microwave antennas have broader beam widths than the millimeter-wave antennas, again wider by about 8 times. A typical beam width from a 2-foot antenna is about 7.5 degrees. This angle is wider than the angular separation of four service customers (hotels) from the relay tower and it is wider than the angular separation of the beam between the relay station and the radio antenna. Specifically, the minimum angular separation between hotels from the relay station is 1.9 degrees. The angular separation between receivers at radio antenna tower 79 and relay station 76 is 4.7 degrees as seen from a transmitter at facility 70. Thus, these microwave beams cannot be separated spatially; however, the FCC Part 101 licensing rules mandate the use of twelve separate transmit and twelve separate receive channels within the microwave 10.7 to 11.7 GHz band, so these microwave beams can be separated spectrally. Thus, the FCC sponsored frequency coordination between the links to individual hotels and between the links to the relay station and the radio antenna will guarantee non-interference, but at a much reduced data rate. The FCC has appointed a Band Manager, who oversees the combined spatial and frequency coordination during the licensing process.

Figure 11:
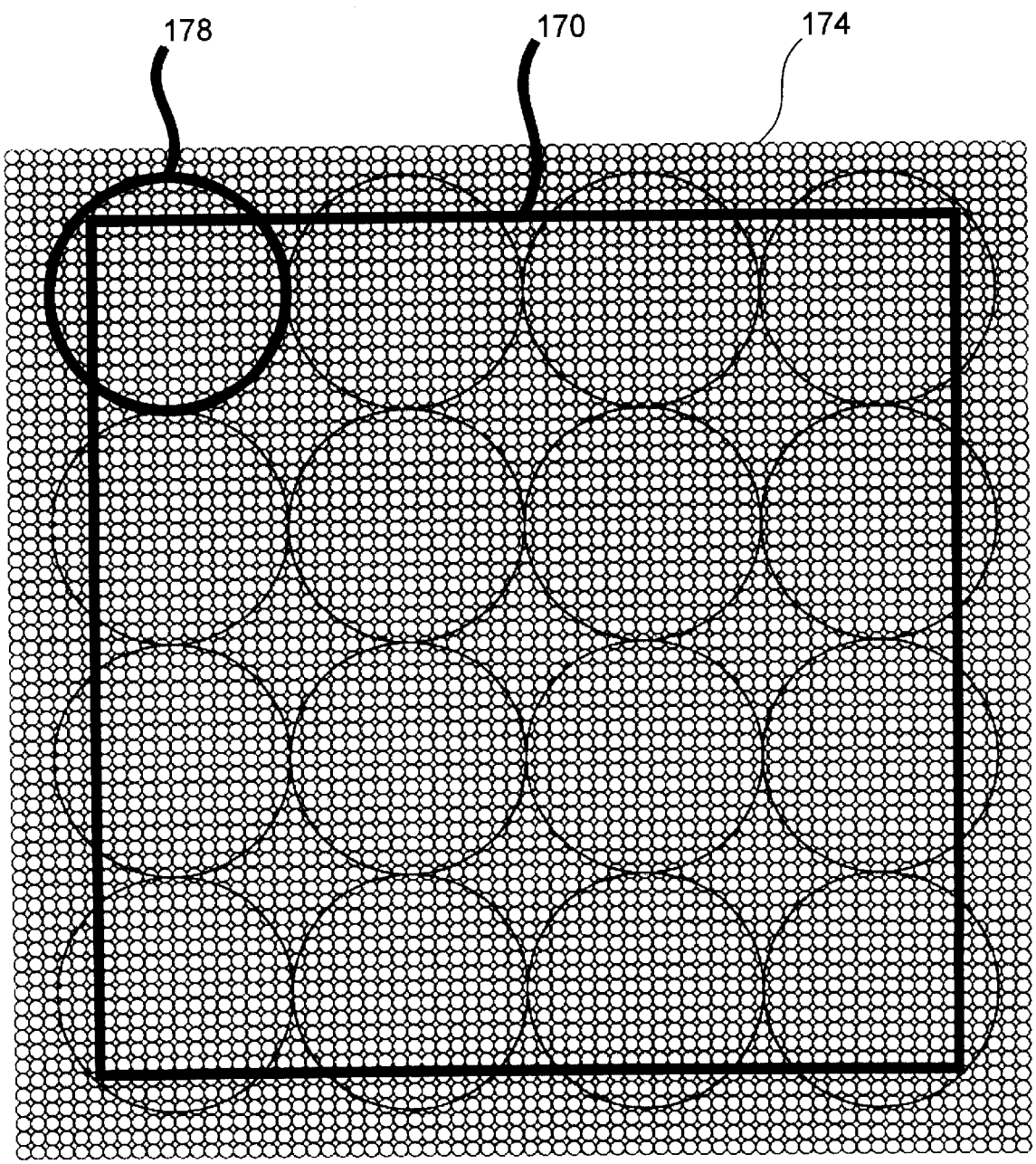
FIG. 11 shows how narrow a beam is when produced by a diffraction-limited 4-foot diameter antenna operating at 94 GHz.

FIG. 11 shows how narrow a beam is when produced by a diffraction-limited 4 foot diameter antenna operating at 94 GHz. An 8-degree by 8-degree field of view is indicated by the surrounding square 170. The tiny circles, which are less than 0.15 degrees in diameter correspond to the full-width, half-maximum power beam-width produced by a diffraction-limited 4 foot diameter antenna operating at 94 GHz i.e. 94 GHz beam-width 174. For comparison, the larger circles 178 (a little larger than 2 degrees) indicate the full-width, half-maximum power beam-width produced by a diffraction-limited 4-foot diameter antenna operating at 5.8 GHz. The corresponding FWHM footprint of a 0.15-degree beam is 40 meters (140 feet) at sixteen kilometers (ten miles) compared to a footprint of 560 meters (1800 feet) at ten miles for a 2-degree beam. Thus, it is apparent that the alignment search for a 5.8 GHz beam can be straightforward whereas the alignment search for a 94 GHz beam having the same size antenna can be much more difficult.

To establish a link requires two antennas (both with narrow beams) to be precisely pointing toward each other. In other words, the process of aligning a link is actually a 4-dimensional alignment (azimuth and elevation angles on antenna one and azimuth and elevation angles on antenna two).

A simple method of establishing such a coalignment is to use the signal from one antenna as an alignment aid for its companion antenna. With relatively broad beams, such as a 5.8 GHz beams, this simple method of coalignment can work. However, this simple method does not work well when applied to narrow millimeter wave beams emanating from large aperture antennas. One major problem with aligning two very narrow beam antennas is that one of the antennas has to be approximately aligned first before the second antenna can use the first antenna's signal as an alignment aid.

The simple method of coalignment could be made to work by brut force of an exhaustive 4 dimensional search but this would typically consume valuable installation time and require expensive mounts (capable of 0.1 degree precise and repeatable positioning of large and heavy antennas) for both antennas. Assuming that each beam pointing step could be made and the antenna tightened into position in one minute, then the amount of time required to check each position within the four dimensional 8×8 degree window (8 degree by 8 degree for antenna one and 8 degree by 8 degree for antenna two) would be of the order of 8 million minutes; i.e., $(8/0.15)^4$ minutes or 15 years. Even if the process were automated with expensive and precise motor driven antenna mounts so that each pointing step could be accomplished in just one second, then the complete search time would still be too long to be practical (8 million seconds or 3 months).

Figure 12A:
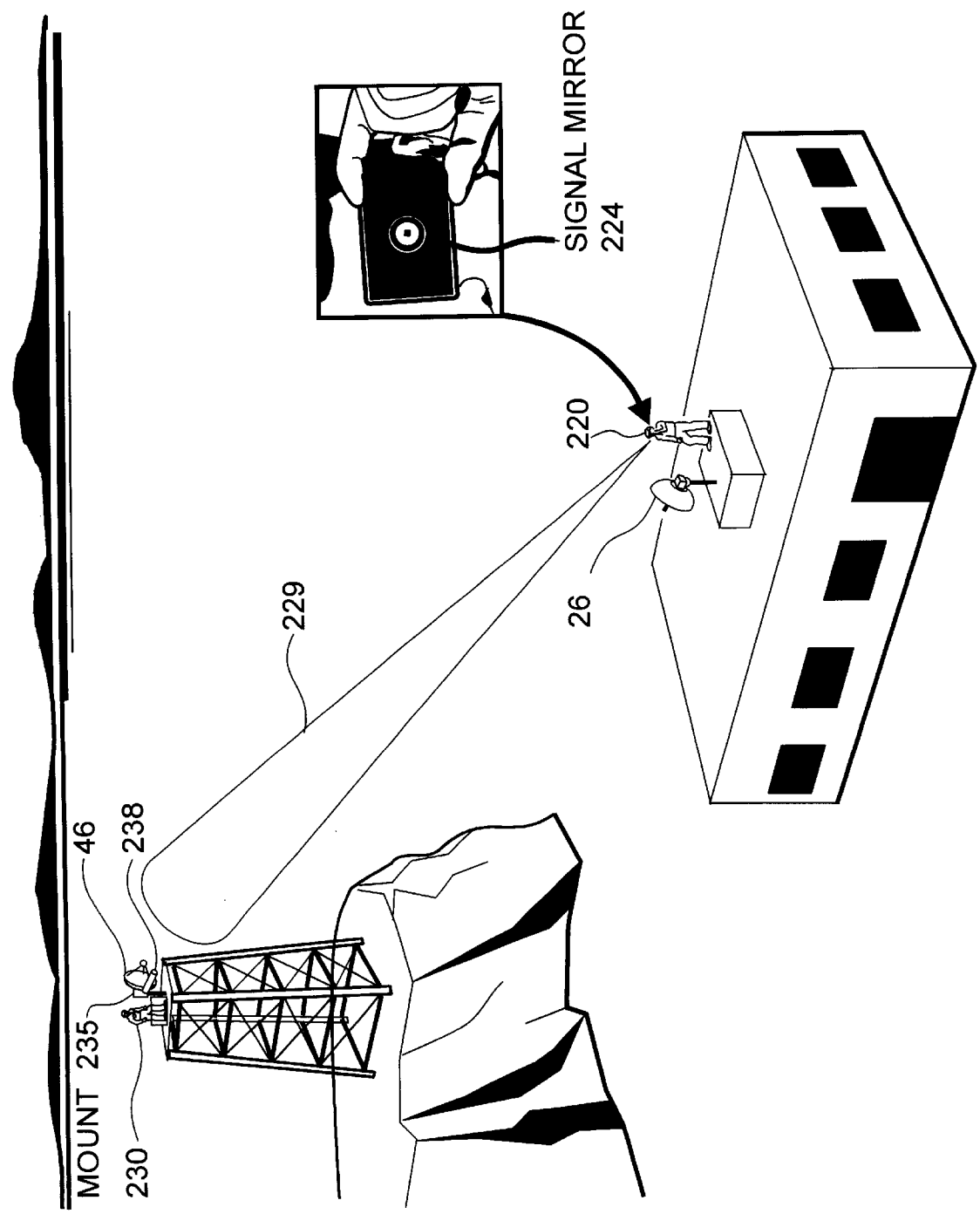
FIGS. 12A and 12B diagrammatically show how a signaling device is used to aid in the preliminary alignment of the telecommunications link.
Figure 12B:
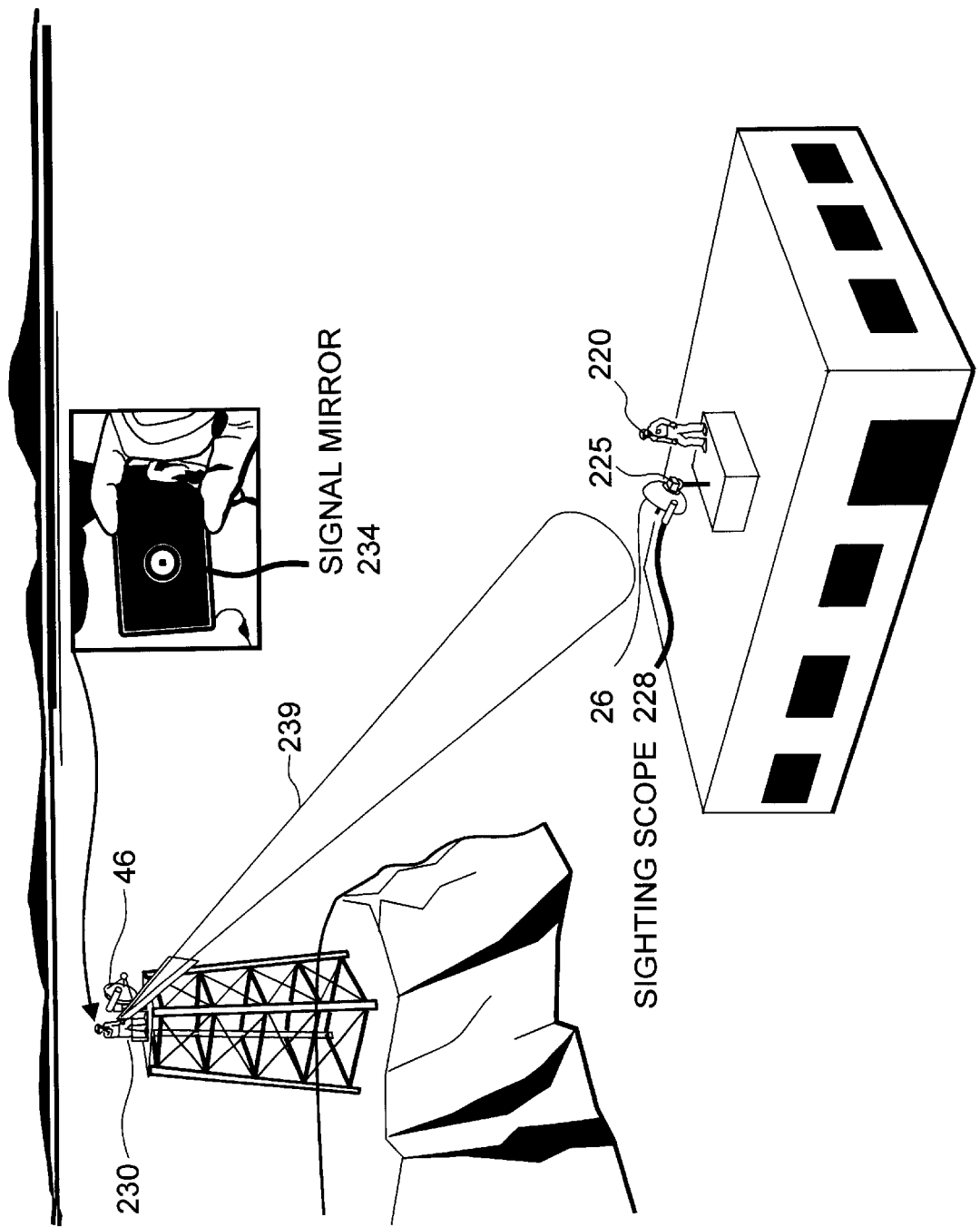

FIGS. 12A and 12B diagrammatically show how a signaling device is used to aid in the preliminary alignment of the telecommunications link. FIG. 12A shows a first installer 220 near a first antenna 26 (e.g. corresponding to location 70 of FIG. 8) holding a first rescue signaling mirror 224 available from Outback Gear, Niles, Ohio, an example of a signaling device. First rescue signaling mirror 224 reflects sunlight 229 toward second antenna 46 (e.g., corresponding to location 76 of FIG. 8). Second installer 230 looks through a second sighting scope 238 that has been previously aligned with the beam axis of second antenna 46. Second installer 230 adjusts second mount 235 of second antenna 46 to point second sighting scope 238, and thereby also second antenna 46, toward first rescue signaling mirror 224. These little mirrors (about 2 inches by 3 inches) produce narrow beams (but with relatively large footprints at a distances of 10 miles), and the installers can scan the beams so the reflected sun light covers a large enough range to easily encompass the opposite antenna location. The signaling mirror's output is easily distinguishable against the background light because the beam's brightness is essentially equal to the sun's brightness (though the signaling mirror's angular extent is much smaller).

A similar procedure is then followed except that the roles of the first installer (and associated equipment) are swapped with the second installer (and associated equipment). FIG. 12B shows second installer 230 near second antenna 46 holding a second rescue signaling mirror 234. Second rescue signaling mirror 234 reflects sunlight 239 toward first antenna 26. First installer 220 looks through a first sighting scope 228 that has been previously aligned with the beam axis of first antenna 26. First installer 220 adjusts a first mount 225 of first antenna 26 to point first sighting scope 228, and thereby also first antenna 26, toward second rescue signaling mirror 234.

After pre-alignient with signaling mirrors has been performed, the antennas are aligned to within about 1 degree or better. With such an optical pre-alignment a large reduction in the alignment search space has been accomplished. Instead of an 8 degree by 8 degree (for antenna one) by 8 degree by 8 degree (for antenna two) 15 year search, the problem is reduced to a 4-dimensional 1 degree search. In other words, the search space has been reduced by a factor of $8^4$ (4096). (An alternative to the reflecting mirror, prealignient can also be accomplished using a narrow beam light source such as a searchlight or laser. In this case it may be desirable to do the pre-alignient in the early evening or at night.

With a 1-degree alignment for a 4-foot wide 94 GHz antenna system, communication may be possible with this imprecise alignment but both antennas would be receiving and sending via each other's side lobes. Depending on the aperture illumination functions for the antennas, the first side lobes will contain 13 dB to 40 dB less power than the primary beam (the smaller diminution corresponds to a uniformly illuminated aperture while the greater reduction corresponds to a very tapered illumination). To make matters even more challenging, it is likely that the antennas are not even looking at each other's first side lobe, but rather at a second, third or still higher order side lobe. Thus the amount of power transferred between two antennas pre-aligned to a seemingly accurate 1-degree level of precision, is likely several orders of magnitude smaller than for a well-aligned pair.

Figure 13:
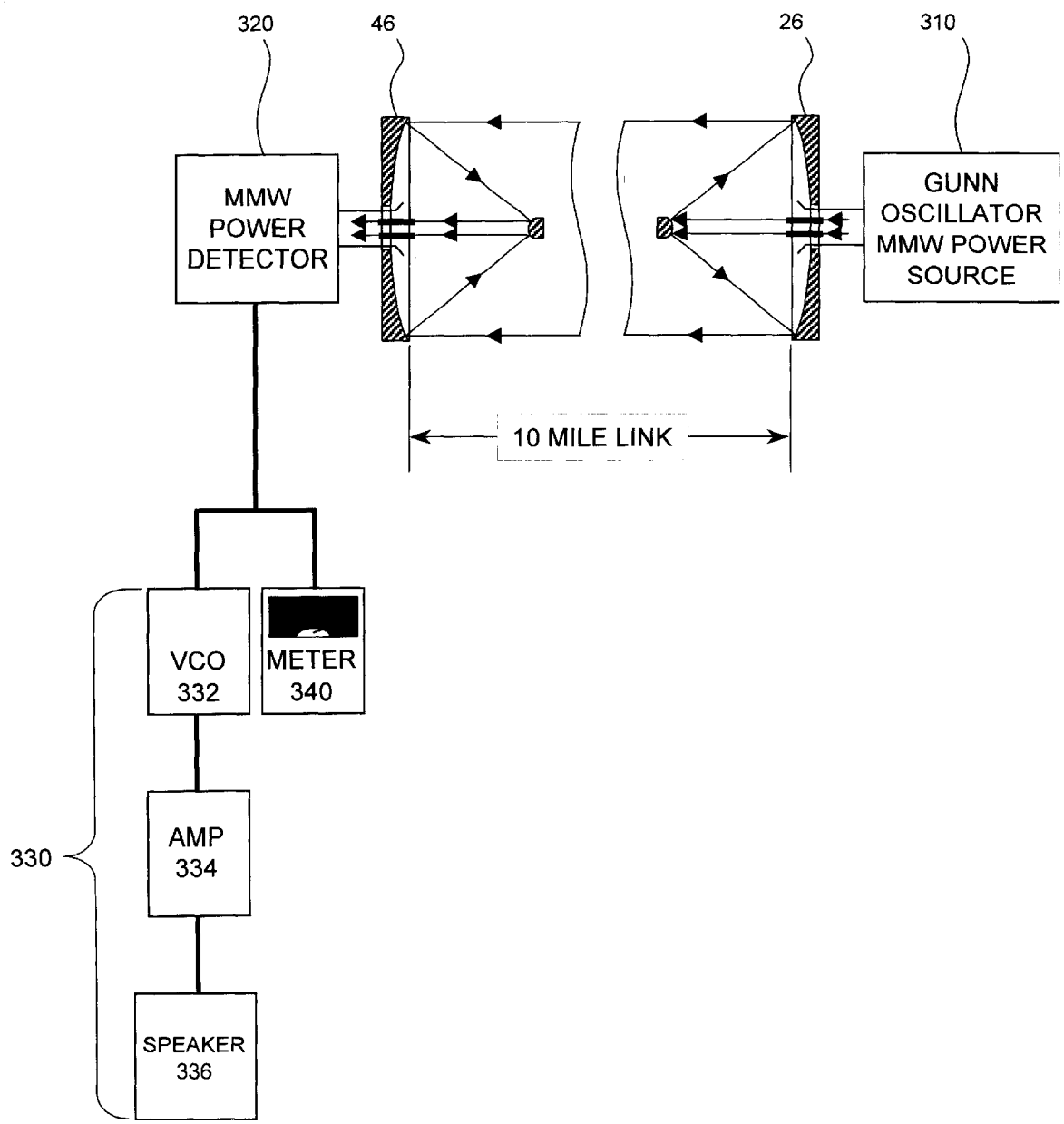
FIG. 13 is a schematic of an alignment system comprising a Gunn oscillator power An source and a power detector.

For more precise alignment Applicants prefer to use the alignment system illustrated in FIGS. 13 through 15B. FIG. 13 is a simplified schematic of an alignment system comprising a Gunn oscillator power source 310 and a millimeter-wave power detector 320. For the alignment, Gunn oscillator power source 310 and millimeter-wave power detector 320 replace the radio transceiver pairs illustrated in FIGS. 5 and 6 during the alignment procedure. Gunn oscillator power source 310 and millimeter-wave power detector 320 are attached to antennas 26 and 46 as shown in FIG. 13. By comparison with the radios that the power source and the power detector replace, the later are much more sensitive and have much greater dynamic range.

The Gunn oscillator 310 uses a gallium arsenide diode as its millimeter-wave power source and is available, for example, from Spacek Labs Santa Barbara, Calif. The Gunn oscillator 310 benefits by a factor of 2 in power (3 dB) on average compared to a radio by virtue of the fact that it is always turned on. The Gunn oscillator benefits by a factor of 5 in power (7 dB) compared to a radio because the Gunn oscillator does not have to suffer the conversion loss of the modulator. Hence, the Gunn oscillator can contribute about a factor of 10 (10 dB) improvement in sensitivity relative to radio sets.

Figure 14:
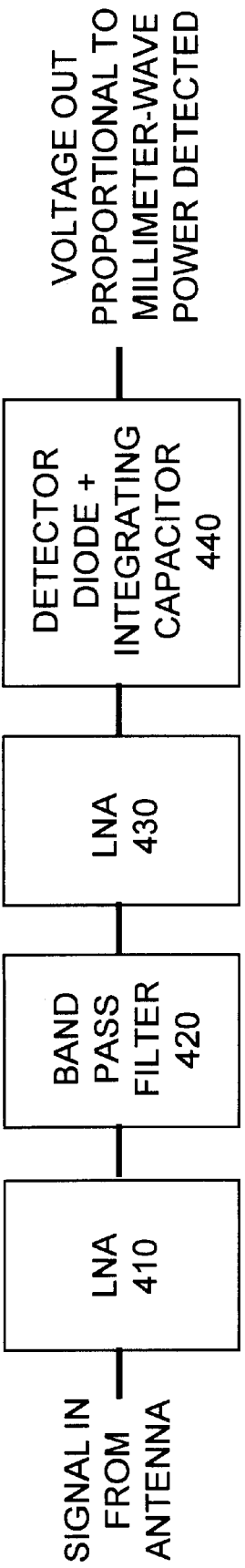
FIG. 14 is a schematic of the millimeter-wave power detector.

The millimeter-wave power detector provides another resource for increasing sensitivity. FIG. 14 is a schematic of the millimeter-wave power detector. A first low noise amplifier (LNA) 410, available, for example, from HRL Malibu, Calif., amplifies a signal received by antenna 46 (FIG. 13) then sends the amplified signal to a bandpass filter 420, with about 1 GHz bandwidth (centered at millimeter-wave frequency of the Gunn oscillator 310) available, for example, from Quinstar Torrance, Calif. After filtering the signal is again amplified by a second LNA 430, available, for example, from HRL Malibu, Calif. The twice amplified and once filtered signal is then converted by detector diode and integrating capacitor 440 to a voltage that is proportional to the original millimeter-wave signal power detected with a detector diode, available, for example as Model HP 9161, from Hewlett-Packard Santa Rosa, Calif. A post detection "integrating" capacitor is used which can result in overall bandwidth as narrow as 10 MHz or even as narrow as 1 kHz. Here the improvement stems from the ability to narrow the bandwidth (and hence noise power) of the detector. This is possible since we are only interested in detecting and measuring power in the case of aligning a link as contrasted with the requirements that prevail when sending data at extraordinarily high data rates. Thus, instead of needing 1 GHz or more of bandwidth (for high speed data transmission), it is possible to use only 10 MHz or less (during alignment) which narrows the band by a factor of greater than 100 and results in an improvement, which scales as the square-root of the bandwidth, by a factor of 10 (10 dB) or more.

By combining both of the above described alignment aids it is therefore possible to increase the sensitivity and dynamic range of a link by a factor of 100 (20 dB) during the alignment procedure.

An additional aid provided by the alignment system of FIG. 13 is the audio output device 330 that allows hands-free and eyes-free adjustments to a given antenna while the installer listens for improvements in the link alignment. A voltage proportional to the detected power level is generated in the millimeter wave detector 320 and sent to the voltage controlled oscillator (VCO) 332. The oscillating output of VCO 332 is amplified by amplifier 334 then converted from electrical signal to auditory signal by speaker 336. In addition to the auditory feedback for the installer, FIG. 13 shows a visual feedback by means of the voltage meter 340. The voltage meter 340 is useful for making comparison of power over relatively longer time frames, say minutes or longer, while the audio output device 330 is more useful for making comparisons of power over relatively shorter time frames such a few seconds or less. Therefore, both methods of feedback are useful and desirable.

Figure 15A:
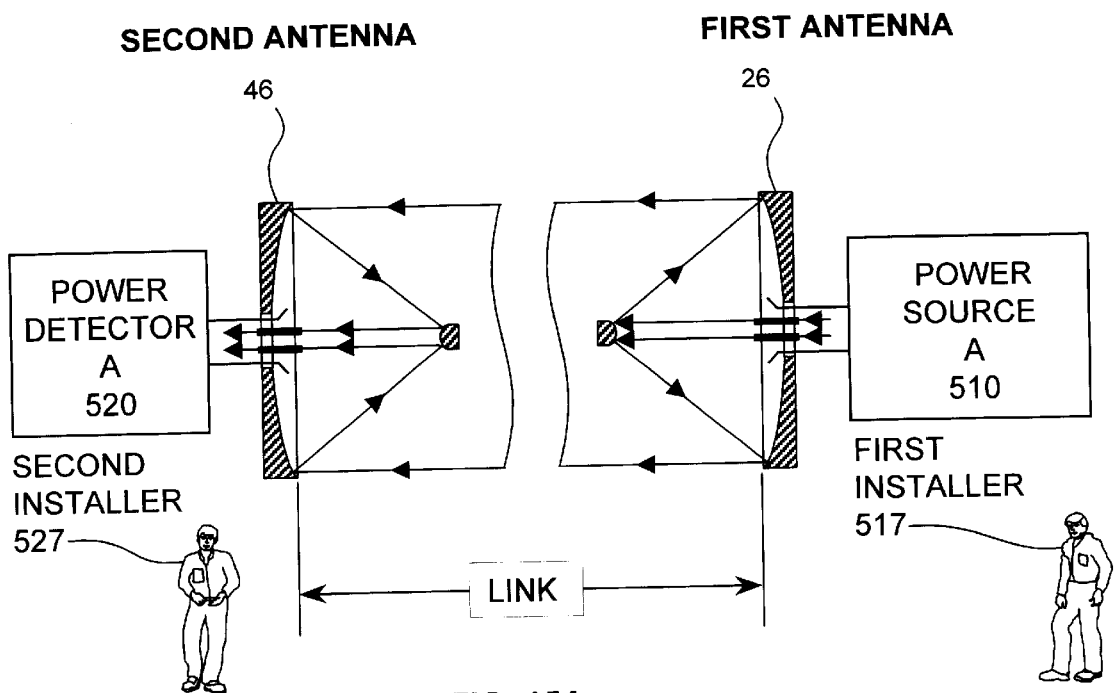
FIGS. 15A and 15B illustrate the positions of a power source and a power detector relative to first and second antenna during the fine alignment procedures.
Figure 15B:
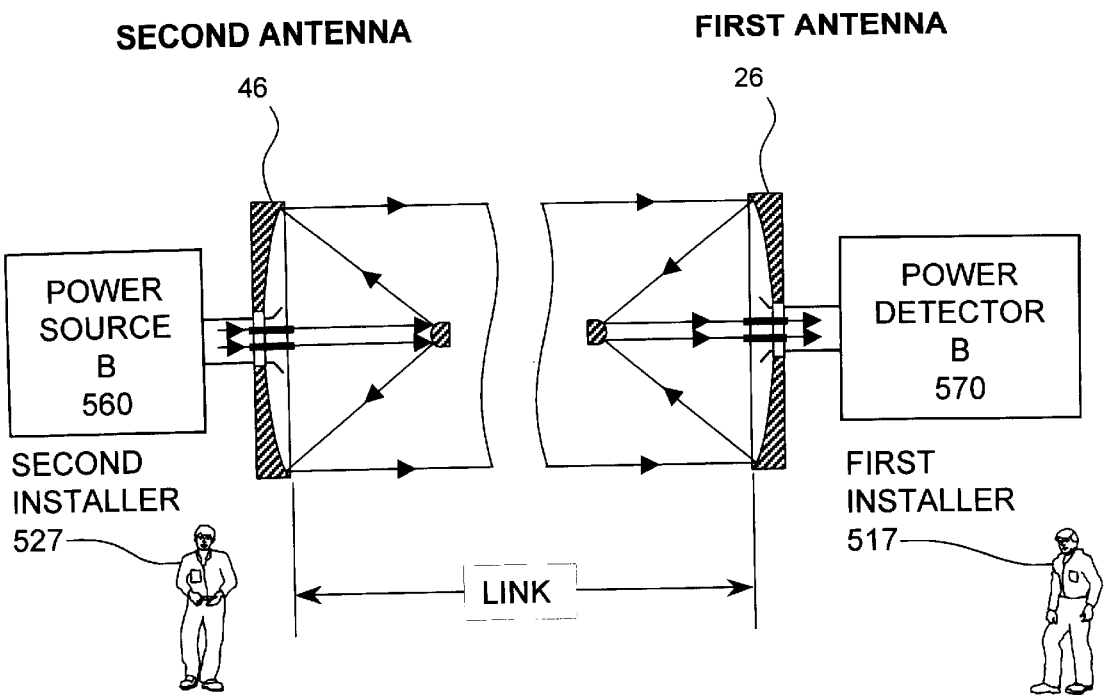

FIGS. 15A and 15B describe a preferred alignment method. FIG. 15A illustrates the positions of a power source A 510 and a power detector A 520 relative to first antenna 26 and second antenna 46 during the fine alignment procedure for the second antenna 46. A first installer 517 turns on power source A 510. The emitted power is directed toward second antenna 46 as a result of the prior preliminary alignment that was performed with the aid of signaling mirrors. A second installer 527 monitors the power detected by power detector A 520 while making small angular perturbations on the second antenna. Due to the prior preliminary alignment of both antennas, and the enhanced sensitivity of the alignment aids, the power detector A 520 is assured of receiving sufficient signal immediately upon initiating this fine alignment procedure. In other words, the second installer does not need to do any angular scan searching to acquire the signal. It is instantly on. The acquired signal has sufficient strength to be readily distinguished from background noise.

Second installer 527 continues to monitor the power detected by power detector A 520 while using small angular perturbations on the second antenna 46 to increase the strength of the received signal. Angular perturbations are continued along one axis until a maximum received signal is found. Then angular perturbations are performed along the other axis until a new, and larger, maximum received signal is found. This procedure is repeated, alternating between the two axes until a global maximum is found which corresponds to the best alignment orientation for second antenna 46.

Once the orientation has been optimized for second antenna 46 it is time for aligning first antenna 26. FIG. 15B illustrates the positions of a power source B 560 and a power detector B 570 relative to first antenna 26 and second antenna 46 during the fine alignment procedure for the first antenna 26. To achieve this configuration, first installer 517 removes power source A from first antenna 26 and replaces it with power detector B 570. Simultaneous with this removal and replacement a similar procedure is performed at the second antenna 46. Second installer 527 removes power detector A from second antenna 46 and replaces it with power source B 560.

Now second installer 527 turns on power source B 560. The emitted power is directed toward first antenna 515 as a result of the fine alignment just performed. First installer 517 monitors the power detected by power detector B 570 while using small angular perturbations on the first antenna 26 to increase the strength of the received signal. Angular perturbations are continued along one axis until a maximum received signal is found. Then angular perturbations are performed along the other axis until a new, and larger, maximum received signal is found. This procedure is repeated, alternating between the two axes until a global maximum is found which corresponds to the best alignment orientation for first antenna 26.

Other procedures and variations are clearly possible through generally less desirable than the procedure described above. For example, an installation team could align both antennas while using only one set of power source and power detector (e.g. Set A comprising power source A and power detector A). This may seem a good way to minimize equipment cost for the installation team. There are at least two ways this could be done.

In the first case, the first half of the procedure (alignment of second antenna 46) would be identical with the procedure described above. Then to align the first antenna 26, the installation team could use cell phones to talk information from the power detector A 520 over to first installer 517 during the second half of the procedure (alignment of first antenna 26). This procedure has been performed by the inventors, but is deemed awkward due the need for the second installer 527 to read meter 340 and speak via a cell phone to the first installer 517. This feedback mechanism is less desirable due to time delays and errors involved in the process.

In the second case, power source A and power detector A can be used for the second half of the procedure (alignment of first antenna 26) as well as for the first half of the procedure (alignment of second antenna 46). However, this would necessitate and additional step of transporting the equipment a potentially long distance (up to 10 miles or more) to swap the locations of these alignment aids. Such a swap would overcome the feedback awkwardness just described for the first case alternative procedure, but the labor time cost of such a step is substantial and therefore should be avoided.

Other Embodiments

Any millimeter-wave carrier frequency consistent with U.S. Federal Communications Commission spectrum allocations and service rules, including MMW bands currently allocated for fixed point-to-point services at 57–64 GHz, 71–76 GHz, 81–86 GHz, and 92–100 GHz, can be utilized in the practice of this invention. Likewise any of the several currently-allocated microwave bands, including 5.2–5.9 GHz, 5.9–6.9 GHz, 10.7–11.7 GHz, 17.7–19.7 GHz, and 21.2–23.6 GHz can be utilized for the backup link. The modulation bandwidth of both the MMW and microwave channels can be increased, limited again only by FCC spectrum allocations. Also, any flat, conformal, or shaped antenna capable of transmitting the modulated carrier over the link distance in a means consistent with FCC emissions regulations can be used. Horns, prime focus and offset parabolic dishes, and planar slot arrays are all included.

Transmit power may be generated with a Gunn diode source, an injection-locked amplifier or a MMW tube source resonating at the chosen carrier frequency or at any sub-harmonic of that frequency. Source power can be amplitude, frequency or phase modulated using a PIN switch, a mixer or a biphase or continuous phase modulator. Modulation can take the form of simple bi-state AM modulation, or can involve more than two symbol states, e.g., using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase, or quadrature phase-shift keying (QPSK). Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The detector can be made using silicon or gallium arsenide. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

The backup transceivers can use alternate bands 5.9–6.9 GHz, 17.7–19.7 GHz, or 21.2–23.6 GHz; all of which are covered under FCC Part 101 licensing regulations. The antennas can be Cassegrainian, offset or prime focus dishes, or flat panel slot array antennas, of any size appropriate to achieve suitable gain.

While the above description contains many specifications, the reader should not construe these as a limitation on the scope of the invention, but merely as exemplifications of preferred embodiments thereof. For example, the full allocated MMW band referred to in the description of the preferred embodiment described in detail above along with state of the art modulation schemes may permit transmittal of data at rates exceeding 10 Gbits per second. Such data rates would permit links compatible with 10-Gigabit Ethernet, a standard that is expected to become practical within the next two years. The present invention is especially useful in those locations where fiber optics communication is not available and the distances between communications sites are less than about 15 miles but longer than the distances that could be reasonably served with free space laser communication devices. Ranges of about 1 mile to about 10 miles are ideal for the application of the present invention. However, in regions with mostly clear weather the system could provide good service to distances of 20 miles or more. Accordingly the reader is requested to determine the scope of the invention by the appended claims and their legal equivalents, and not by the examples given above.

What is claimed is:

1. A point-to-point millimeter wave communications system comprising:
   A) a first millimeter wave transceiver system located at a first site capable of transmitting and receiving to and from a second site through atmosphere digital information at rates in excess of 155 million bits per second during normal weather conditions, said first transceiver comprising a first antenna producing a beam having a half-power beam width of about 2 degrees or less, said first antenna being supported with a rigid support providing beam directional stability of less than one-half said half-power beam width during 90 miles per hour steady wind conditions, B) a second millimeter wave transceiver system located at said second site capable of transmitting and receiving to and from said first site digital information at rates in excess of 155 million bits per second during normal weather conditions, said second transceiver comprising a second antenna producing a beam having a half-power beam width of about 2 degrees or less, said antenna being supported with a rigid support structure providing beam directional stability of less than one-half said half-power beam width during 90 miles per hour steady wind conditions, and C) alignment equipment for aligning said first and second antennas, said alignment equipment comprising:
  1) a narrow band oscillator power source; and
  2) a power detector;
    wherein said narrow band oscillator power source is substituted for the signal transmit electronics of said first transceiver and said power detector is substituted for the signal receive electronics of the second transceiver to align the antennas.

2. A system as in claim 1 further comprising a backup transceiver system operating at a data transmittal rate of less than 155 million bits per second and configured to continue transmittal of information between said first and second sites in the event of abnormal weather conditions.

3. A system as in claim 2 wherein said backup transceiver system is a microwave system.

4. A system as in claim 3 wherein said backup transceiver system is configured to operate in the frequency range of 10.7 to 11.7 GHz.

5. A system as in claim 3 wherein said backup transceiver system is configured to operate in the frequency range of 5.9 to 6.9 GHz.

6. A system as in claim 3 wherein said backup transceiver system is configured to operate in the frequency range of 13 to 23 GHz.

7. A system as in claim 1 wherein one of said first and second transceiver systems is configured to transmit at frequencies in the range of about 92.3 to 93.2 GHz and to receive information at frequencies in the range of about 94.1 to 95.0 GHz.

8. A system as in claim 1 wherein each of said first and said second transceiver is configured to transmit and receive information at bit error ratios of less than $10^{-10}$ during normal weather conditions.

9. A system as in claim 8 wherein said first and second systems are capable of transmitting and receiving at rates in excess of 1 billion bits per second and the antennas of both systems are configured to produce beams having half-power beam widths of about 0.36 degrees or less.

10. A system as in claim 8 wherein at least one of said antennas is a prime focus parabolic antenna.

11. A system as in claim 8 wherein at least one of said antennas is an offset parabolic antenna.

12. A system as in claim 8 wherein at least one of said antennas is a Cassegrain antenna.

13. A system as in claim 8 wherein at least one of said antennas is a flat panel antenna.

14. A system as in claim 1 wherein said first transceiver system is configured to transmit and receive information at frequencies between 92 and 95 GHz.

15. A system as in claim 1 wherein said first transceiver system is configured to transmit and receive information at frequencies greater than 57 GHz.

16. A system as in claim 1 wherein said first transceiver system is configured to transmit and receive information at frequencies greater than 90 GHz.

17. A system as in claim 1 wherein both said first and said second transceiver systems are equipped with antennas providing a gain of greater than 40 dB.

18. A system as in claim 1 wherein both said first and said second transceiver systems are equipped with antennas providing a gain of greater than 45 dB.

19. A system as in claim 1 wherein both said first and said second transceiver systems are equipped with antennas providing a gain of greater than 50 dB.

20. A system as in claim 1 wherein said first and said second sites are separated by at least 10 miles.

21. A system as in claim 1 wherein said first and said second sites are separated by at least one mile.

22. A system as in claim 1 wherein said first and said second sites are separated by at least 2 miles.

23. A system as in claim 1 wherein said first and said second sites are separated by at least 7 miles.

24. A method for aligning an antenna of a first millimeter wave transceiver system, comprising signal transmit electronics and signal receive electronics, with an antenna of a second millimeter wave transceiver system, comprising signal transmit electronics and signal receive electronics, said method comprising the steps of:
  a) substituting a narrow band oscillator power source for the signal transmit electronics of said first transceiver;
  b) substituting a power detector for the signal receive electronics of said second transceiver;
  c) aligning said antennas to provide a first precise alignment; and
  d) after the antennas are aligned, reconnecting the transceiver electronics,
    wherein said first transceiver system is configured to transmit and receive information at frequencies greater than 57 GHz.

25. A method as in claim 24 further comprising a backup transceiver system operating at a data transmittal rate of much less than 1 billion bits per second and configured to continue transmittal of information between said first and second transceiver systems in the event of abnormal weather conditions.

26. A method as in claim 25 wherein said backup transceiver system is a microwave system.

27. A method as in claim 24 and further comprising a step, after said first precise alignment, of connecting a power detector to said first antenna and a narrow band oscillator power source to said second antenna and performing a second precise alignment.

28. A method as in claim 24 wherein each of said first and said second transceiver are configured to transmit and receive information at bit error ratios of less than $10^{-10}$ during normal weather conditions.

29. A method as in claim 24 wherein one of said first and second transceiver systems is configured to transmit at frequencies in the range of about 92.3 to 93.2 GHz and to receive information at frequencies in the range of about 94.1 to 95.0 GHz.

30. A method as in claim 24 wherein said first transceiver system is configured to transmit and receive information at frequencies between 92 and 95 GHz.

31. A method as in claim 24 wherein said first transceiver system is configured to transmit and receive information at frequencies greater than 90 GHz.

32. A method as in claim 24 wherein both said first and said second transceiver systems are equipped with antennas providing a gain of greater than 40 dB.

33. A method as in claim 24 wherein both said first and said second transceiver systems are equipped with antennas providing a gain of greater than 45 dB.

34. A method as in claim 24 wherein both said first and said second transceiver systems are equipped with antennas providing a gain of greater than 50 dB.

35. A method as in claim 24 further comprising a step of pre-aligning the antennas using a signaling mirror, a search light or a laser.

36. A method as in claim 24 wherein at least one of said antennas is a prime focus parabolic antenna.

37. A method as in claim 24 wherein said first and said second sites are separated by at least 10 miles.

38. A method as in claim 24 wherein said first and said second sites are separated by at least 2 miles.

39. A method as in claim 24 wherein said first and said second sites are separated by at least 7 miles.

40. A method as in claim 24 wherein at least one of said antennas is an offset parabolic antenna.

41. A method as in claim 24 wherein at least one of said antennas is a flat panel antenna.

42. A method as in claim 24 wherein at least one of said antennas is a Cassegrain antenna.

* * * * *

UNITED STATES PATENT AND TRADEMARK OFFICE
CERTIFICATE OF CORRECTION

| | | |
|---|---|---|
| PATENT NO. | : 6,611,696 B2 | Page 1 of 1 |
| APPLICATION NO. | : 10/041083 | |
| DATED | : August 26, 2003 | |
| INVENTOR(S) | : Chedester et al. | |

It is certified that error appears in the above-identified patent and that said Letters Patent is hereby corrected as shown below:

Col. 1, Line 19, of the specification, add the following heading and sentence:

STATEMENT REGARDING FEDERALLY SPONSORED RESEARCH OR DEVELOPMENT

This invention was made with Government support under contract DASG60-00-C-0101 awarded by U.S. Army Space and Missile Defense Command. The Government has certain rights in the invention.

Signed and Sealed this

Twenty-first Day of August, 2007

JON W. DUDAS
*Director of the United States Patent and Trademark Office*